(12) United States Patent
Jeong et al.

(10) Patent No.: US 9,323,455 B2
(45) Date of Patent: Apr. 26, 2016

(54) MOBILE TERMINAL AND METHOD OF CONTROLLING AN EXTERNAL MOBILE TERMINAL

(71) Applicant: LG ELECTRONICS INC., Seoul (KR)

(72) Inventors: Jaewoo Jeong, Seoul (KR); Sangwoon Lee, Seoul (KR); Sungjin Park, Seoul (KR); Jiyen Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 13/954,336

(22) Filed: Jul. 30, 2013

(65) Prior Publication Data

US 2014/0320425 A1    Oct. 30, 2014

Related U.S. Application Data

(60) Provisional application No. 61/816,699, filed on Apr. 27, 2013.

(30) Foreign Application Priority Data

Apr. 30, 2013    (KR) .................. 10-2013-0048615

(51) Int. Cl.
G06F 3/048     (2013.01)
G06F 3/0488    (2013.01)
G06F 3/14      (2006.01)

(52) U.S. Cl.
CPC ........ *G06F 3/04883* (2013.01); *G06F 3/04886* (2013.01); *G06F 3/1454* (2013.01); *G06F 2203/04806* (2013.01); *G06F 2203/04808* (2013.01); *G09G 2358/00* (2013.01); *G09G 2370/16* (2013.01)

(58) Field of Classification Search
CPC .................... H04M 1/72583; H04M 1/72522; H04M 1/7253
USPC .................... 345/156, 173; 455/566; 709/217
See application file for complete search history.

(56) References Cited

U.S. PATENT DOCUMENTS

2010/0262673 A1* 10/2010 Chang et al. .................. 709/217
2012/0299814 A1* 11/2012 Kwon et al. ................... 345/156
2012/0309464 A1* 12/2012 Lim et al. ...................... 455/566

* cited by examiner

*Primary Examiner* — Dwayne Bost
*Assistant Examiner* — Sepehr Azari
(74) *Attorney, Agent, or Firm* — Birch, Stewart, Kolasch & Birch, LLP

(57) ABSTRACT

A mobile terminal including a wireless communication unit configured to receive information on an event that occurred in an external terminal; a display unit configured to display a notification image notifying the occurrence of the event; and a controller configured to receive a touch input applied to the notification image, and display a control screen on the display unit for controlling the event that occurred on the external terminal.

9 Claims, 36 Drawing Sheets

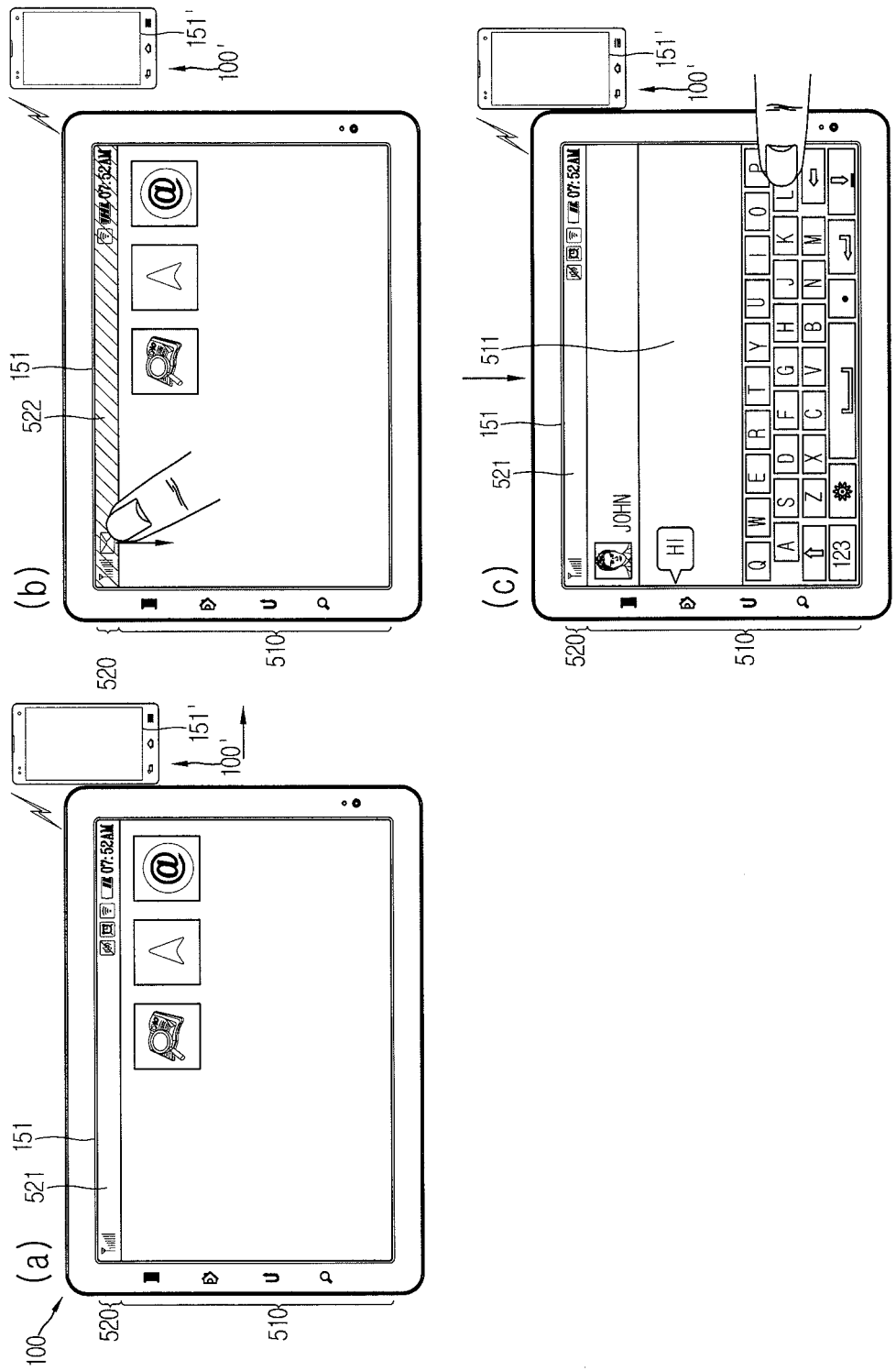

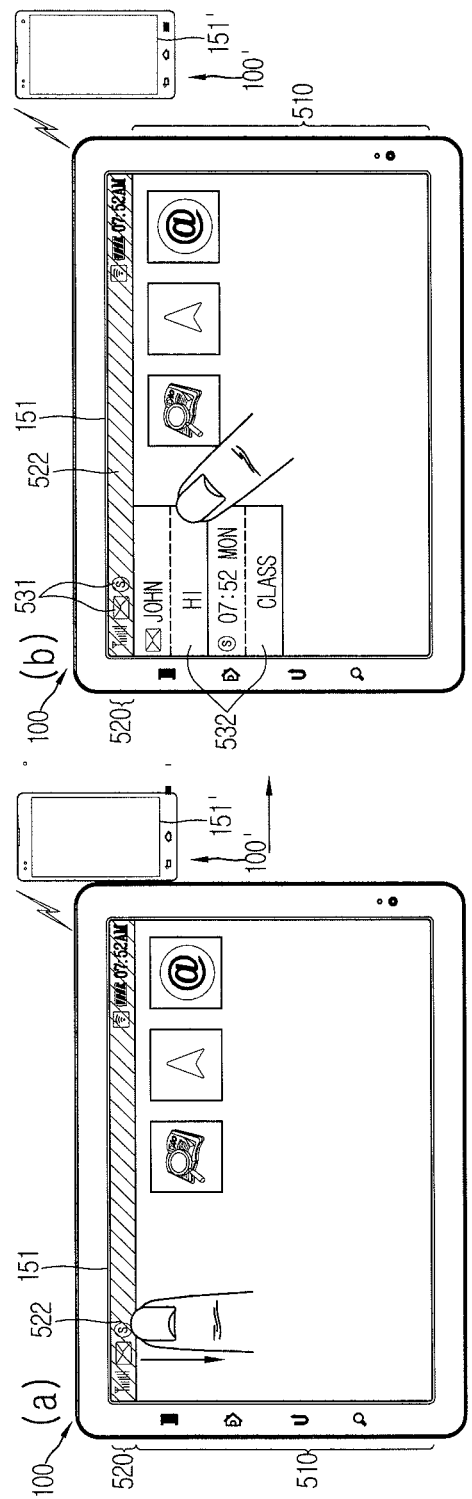

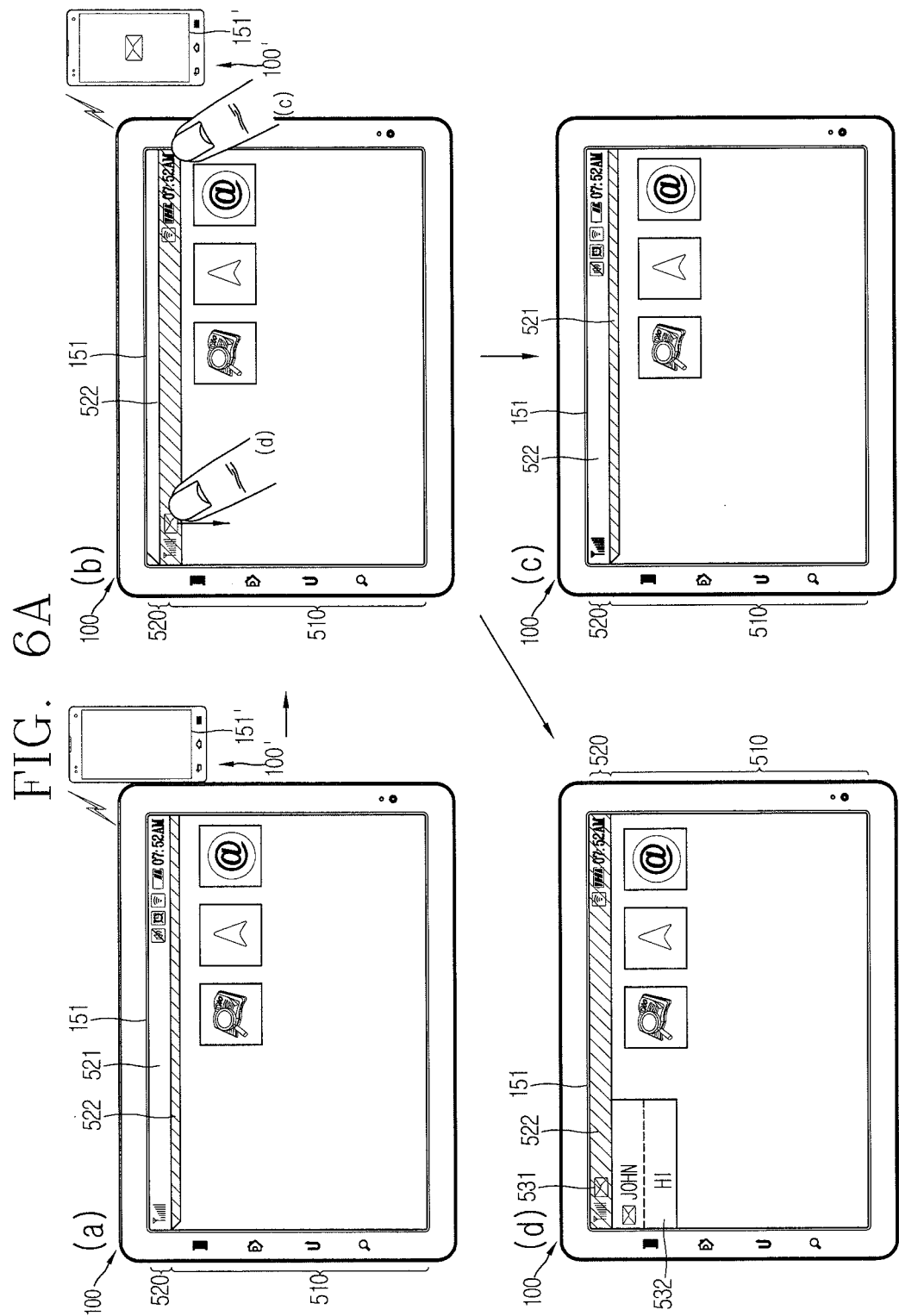

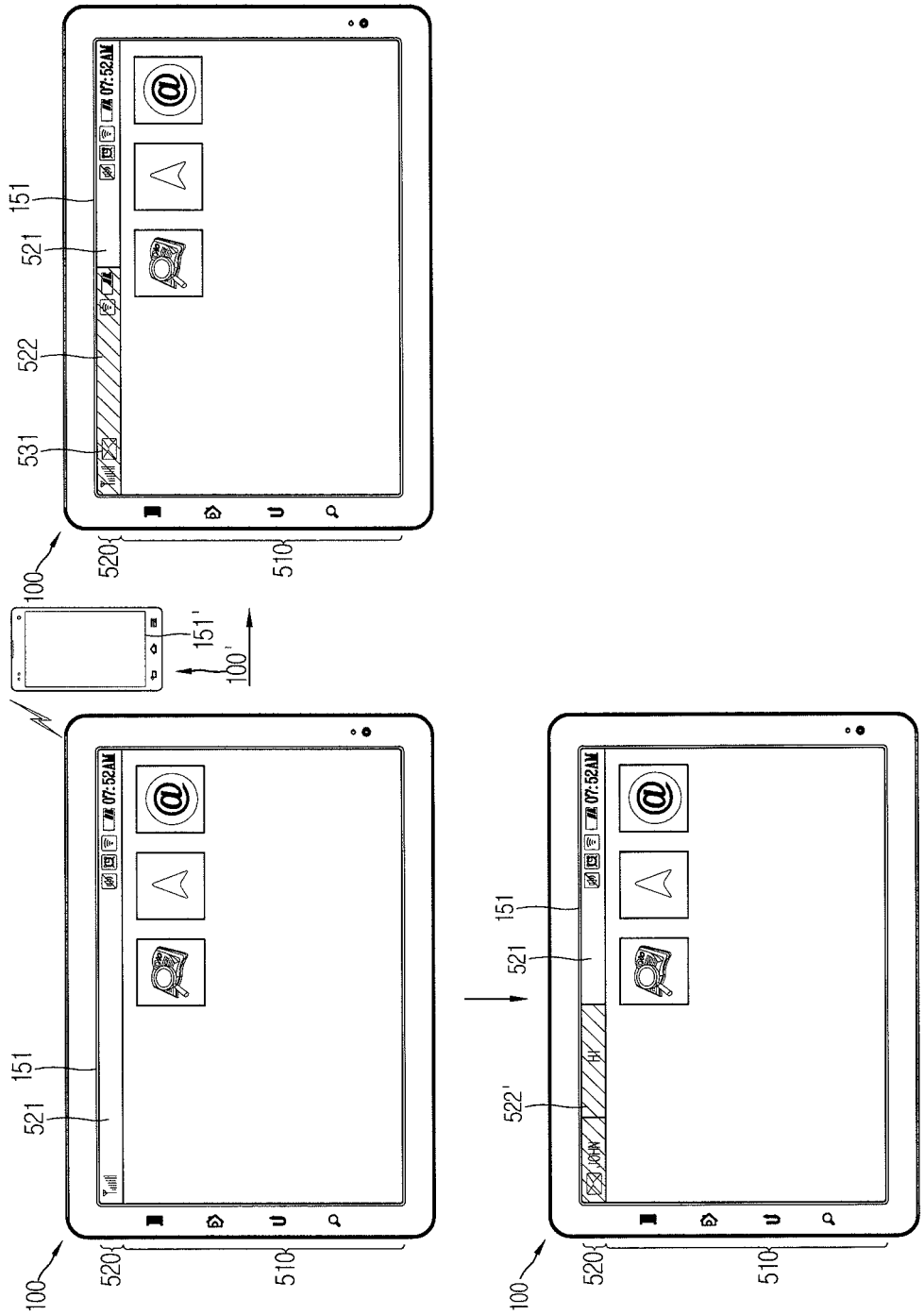

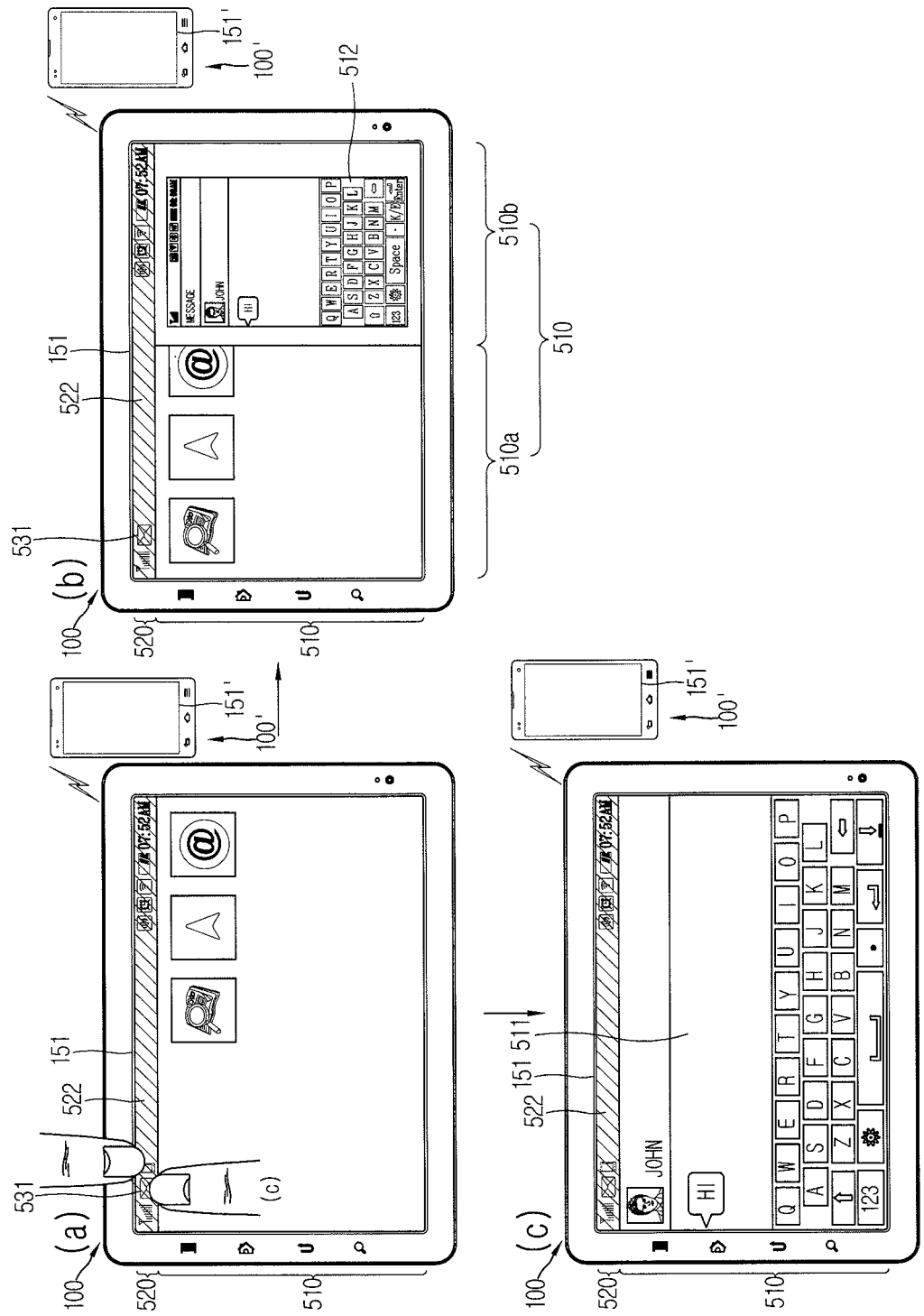

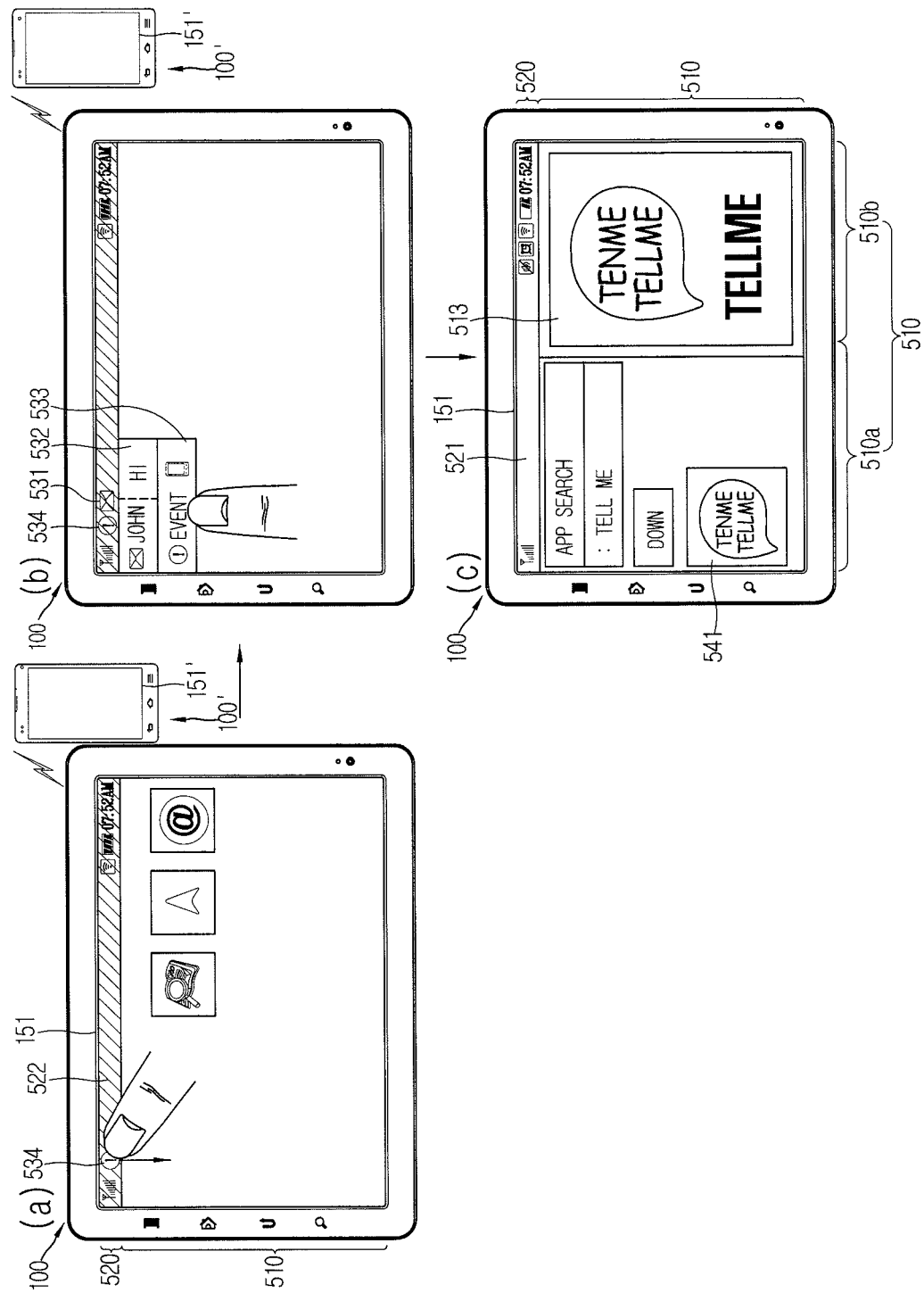

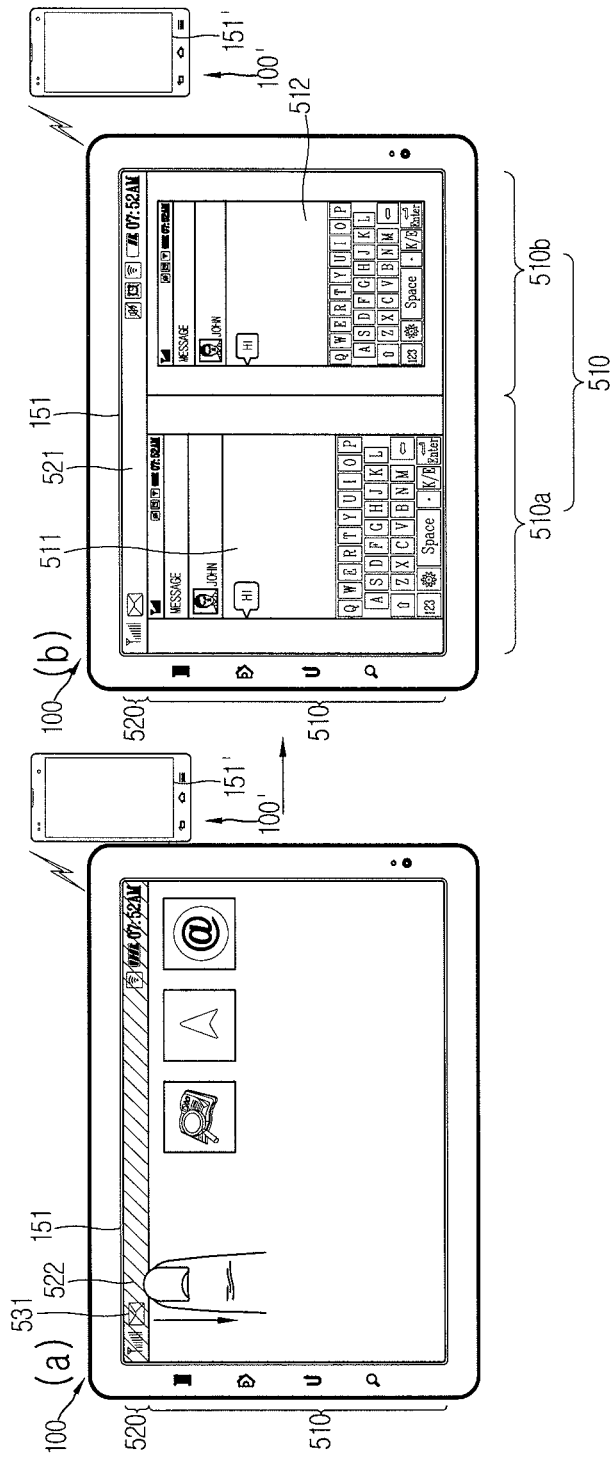

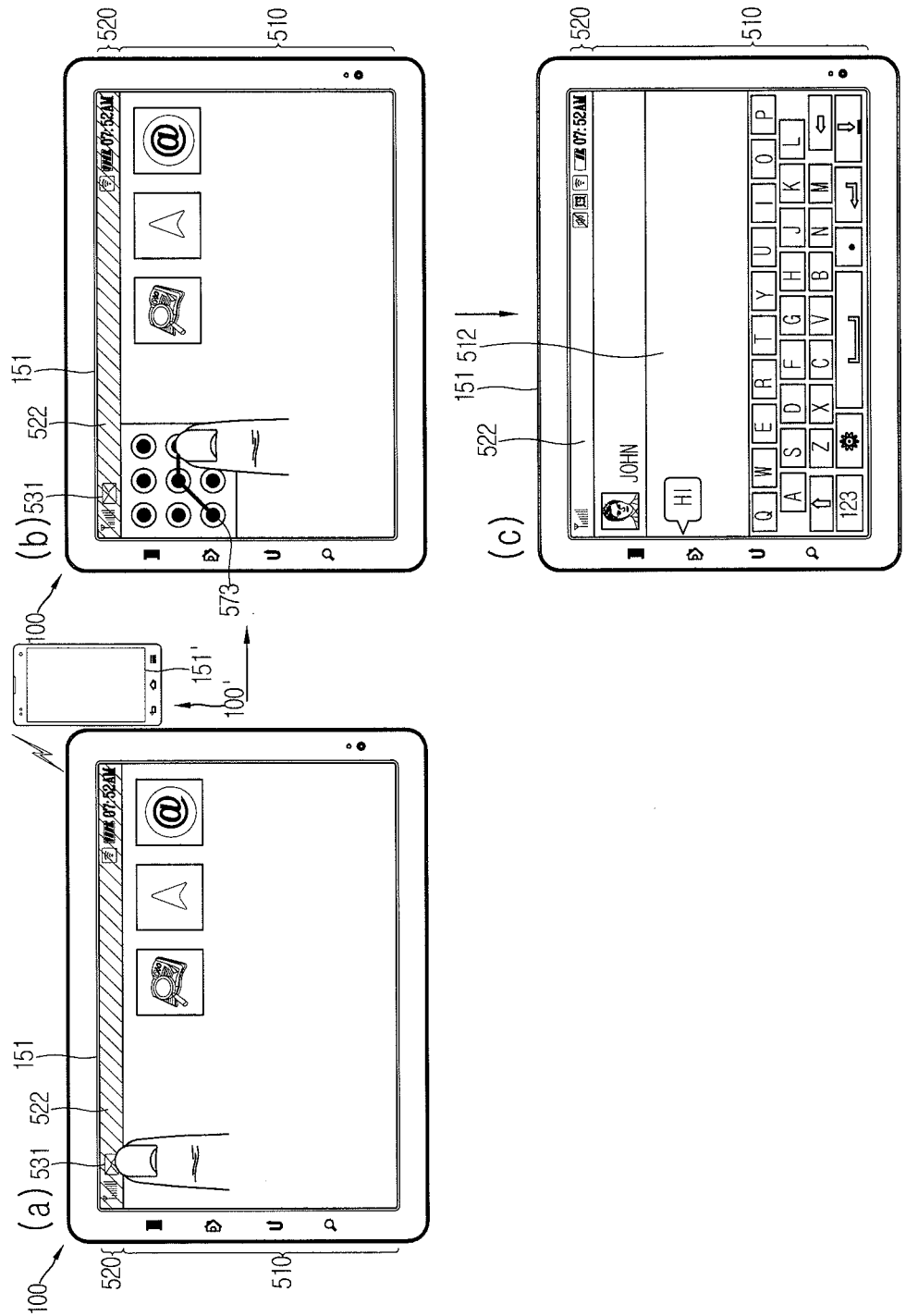

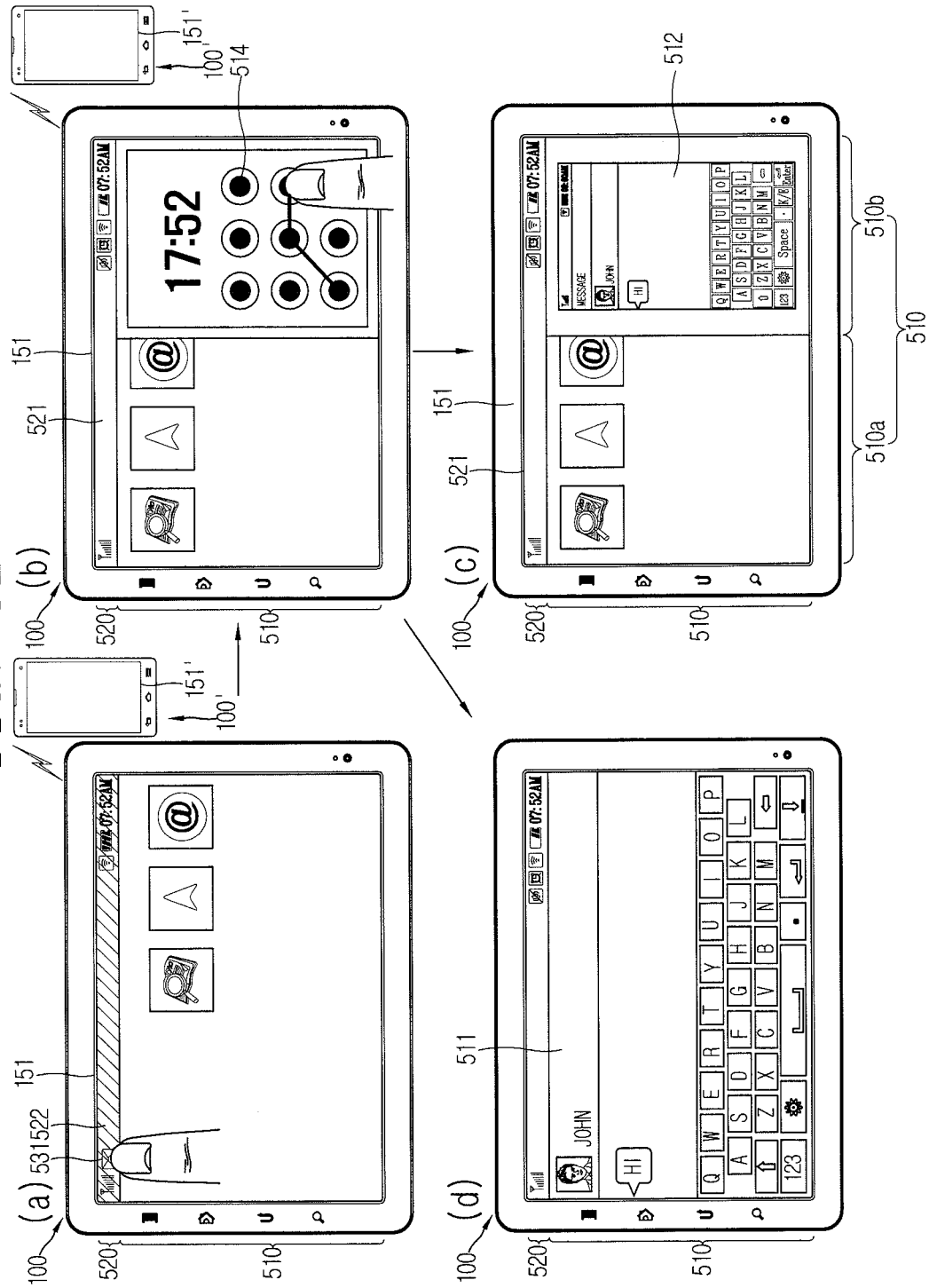

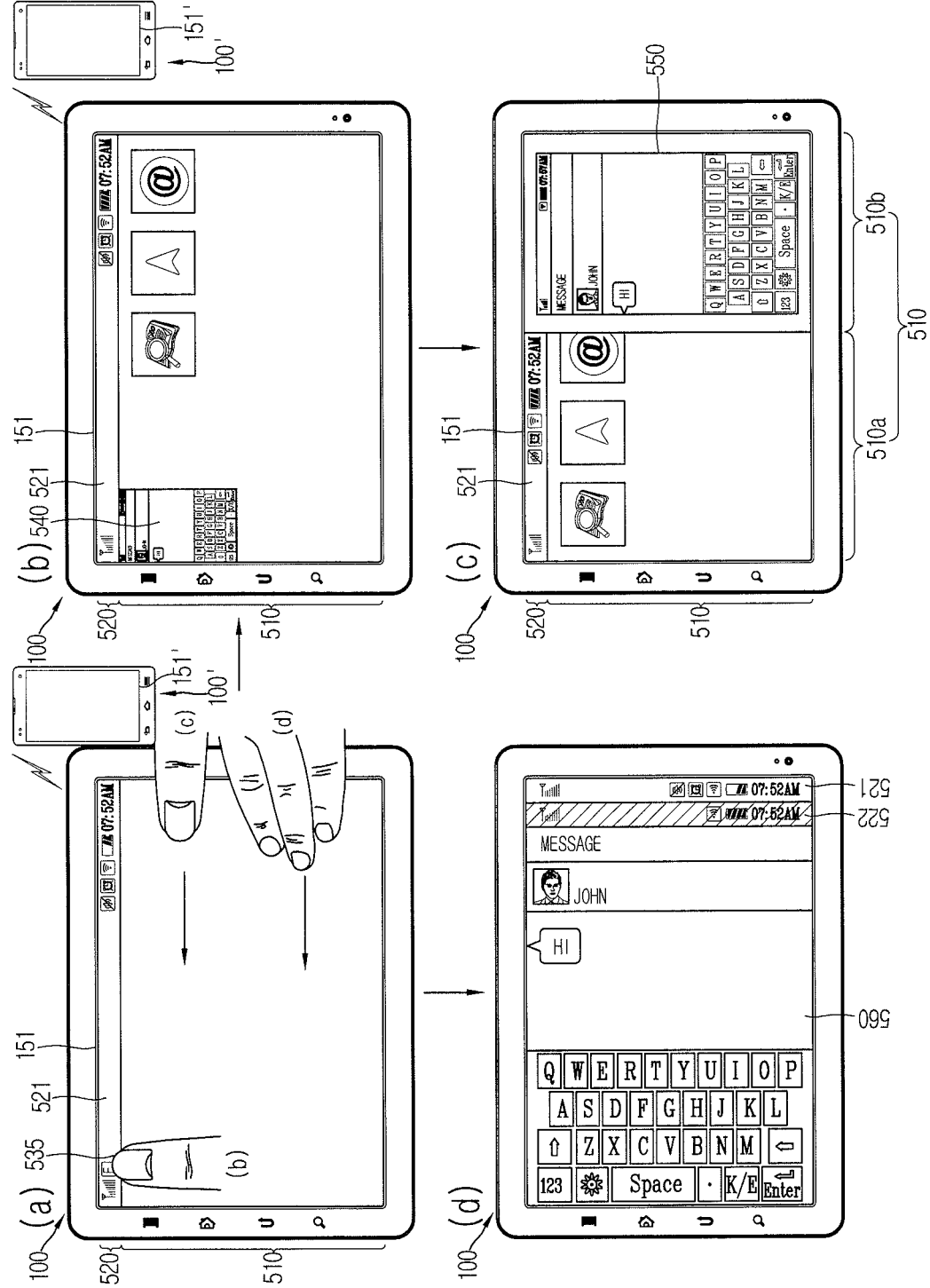

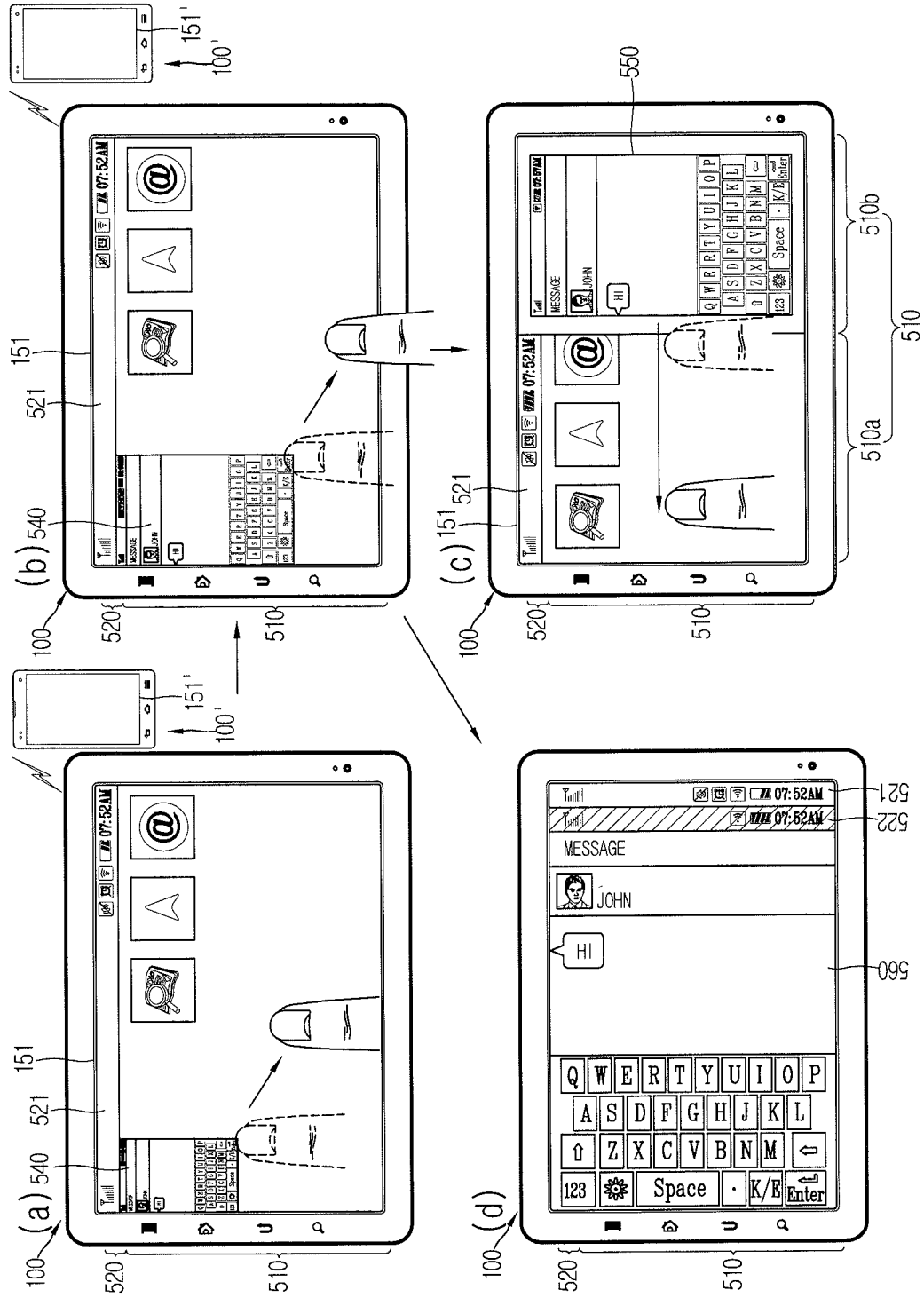

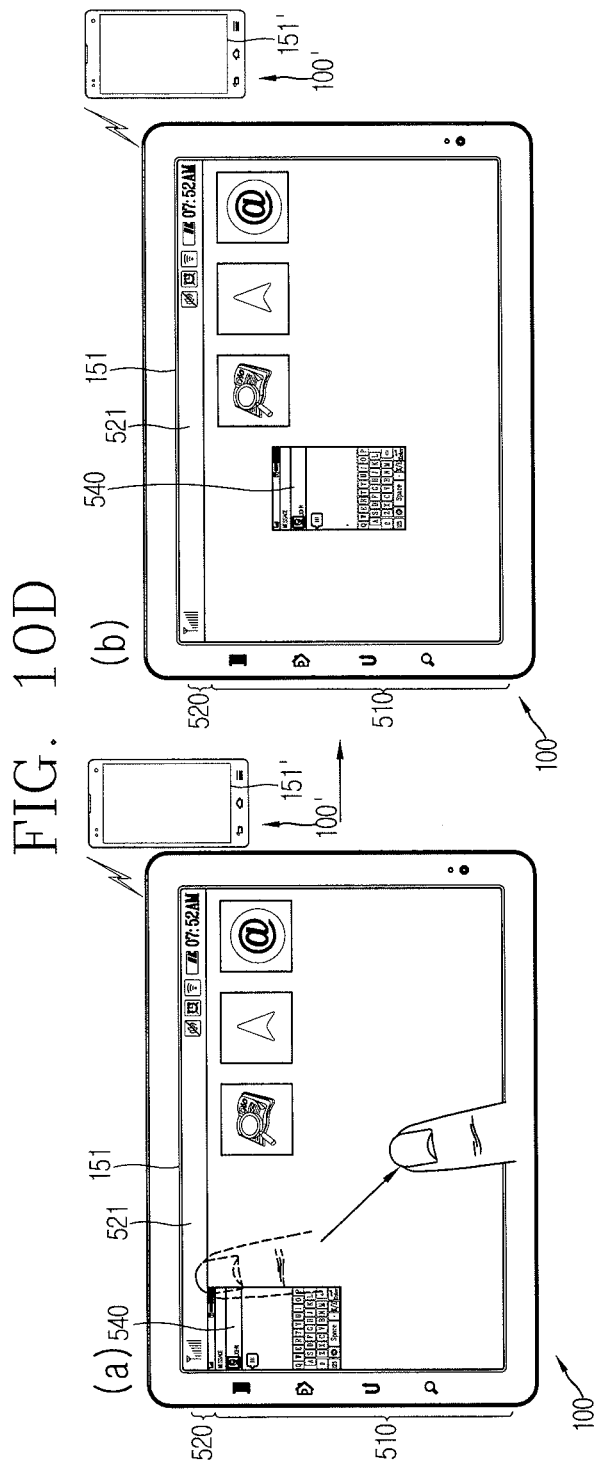

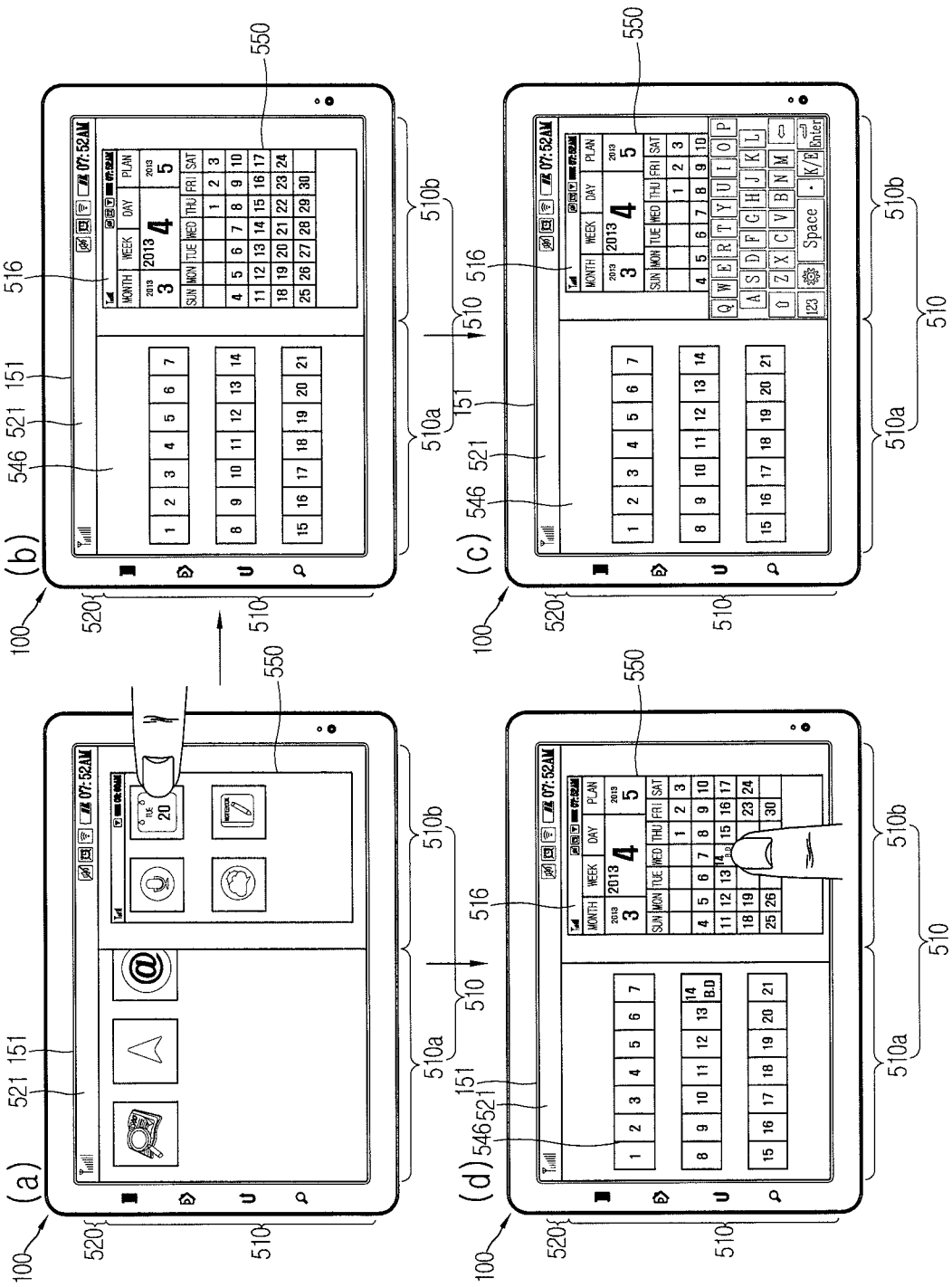

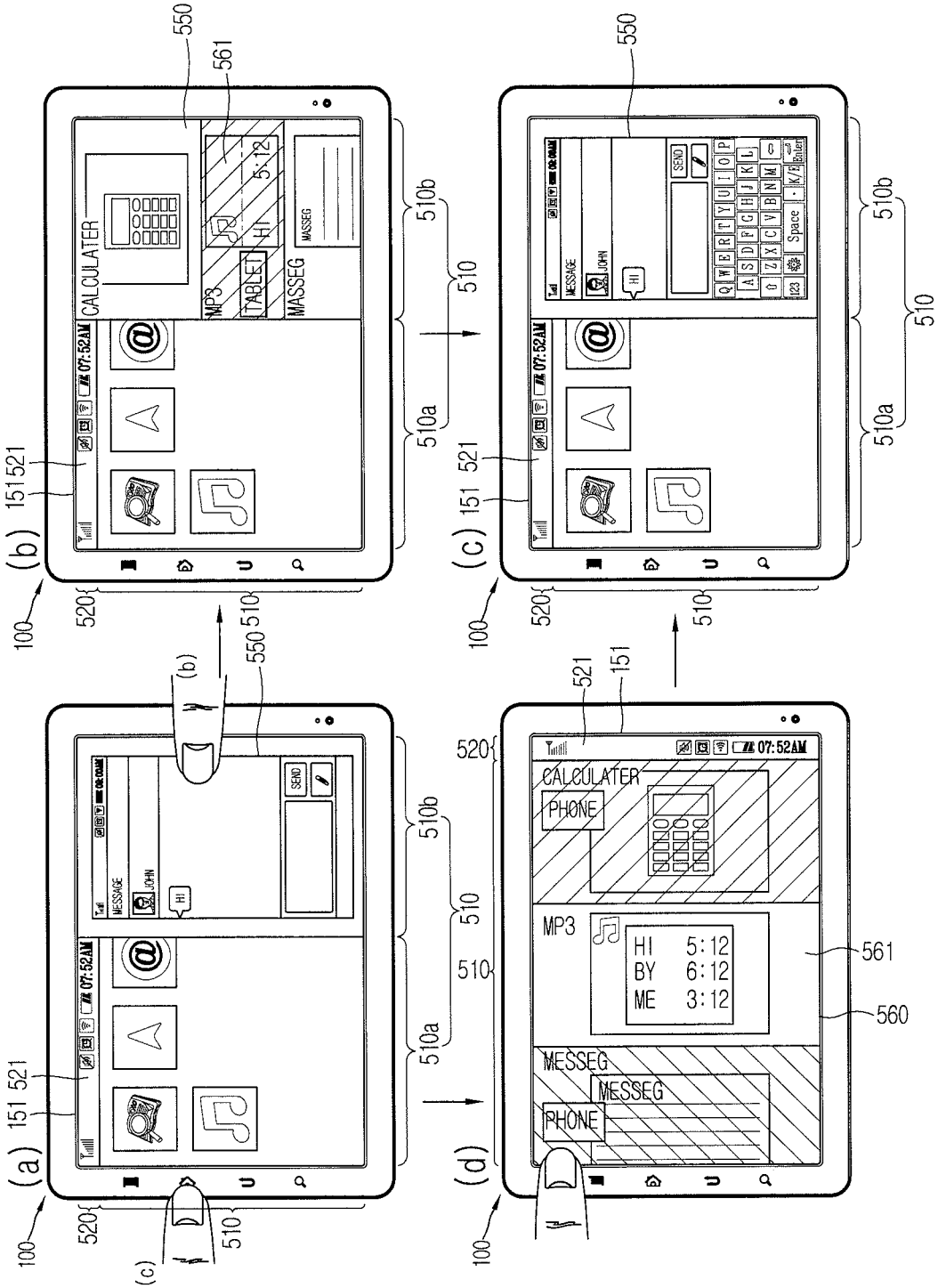

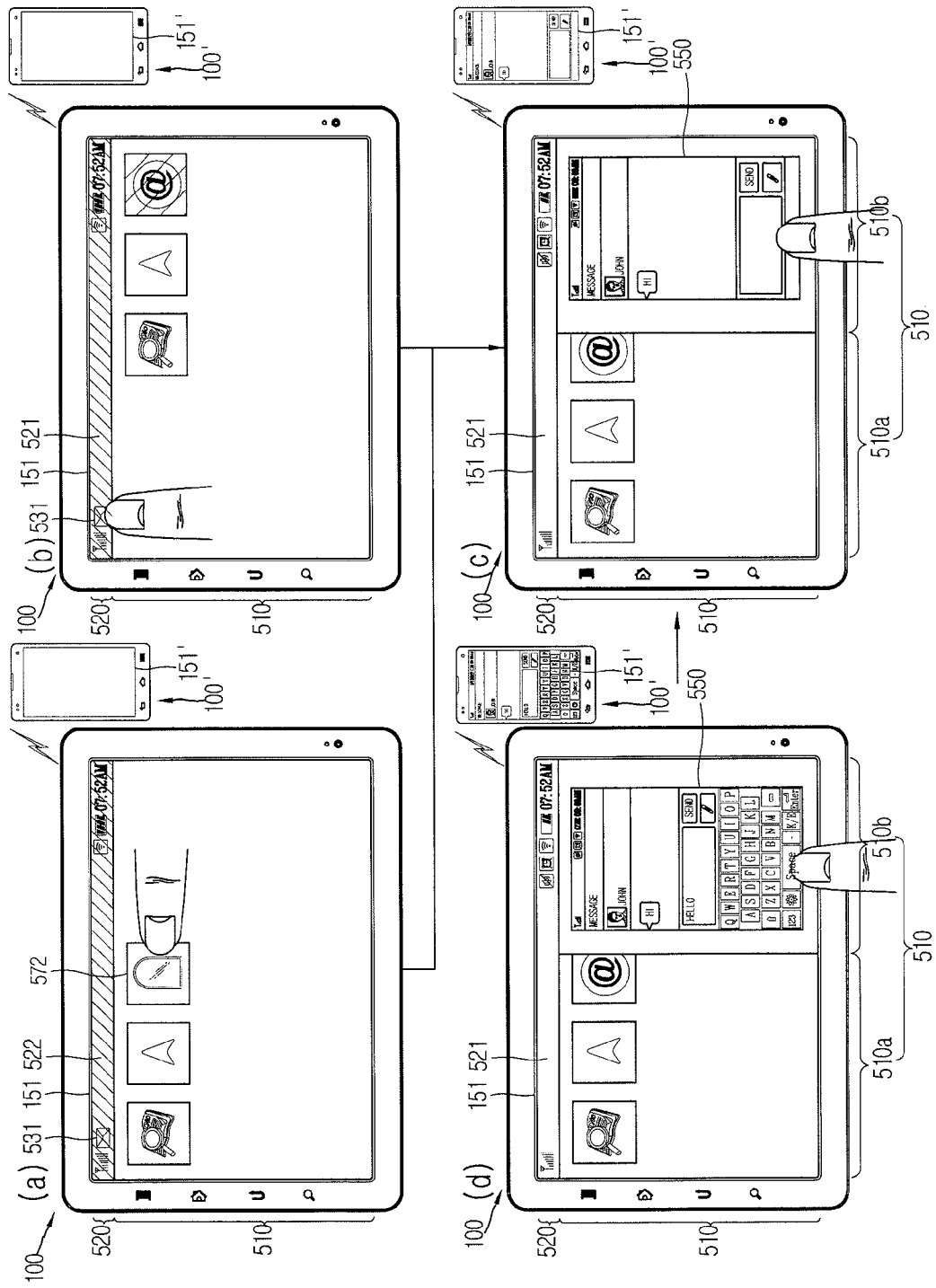

FIG. 14B
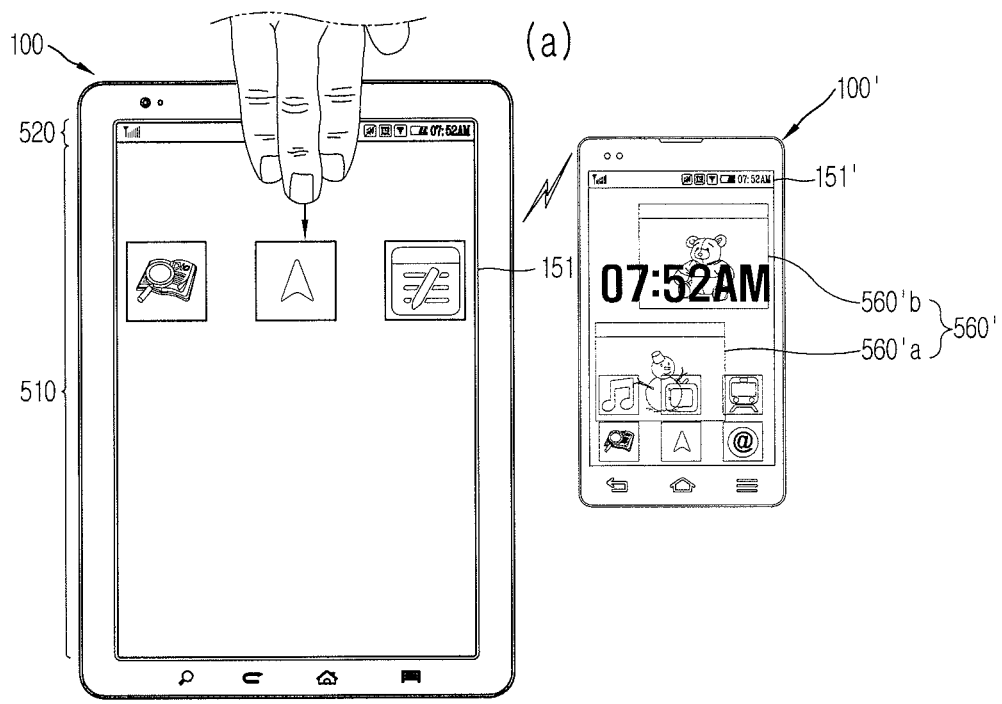
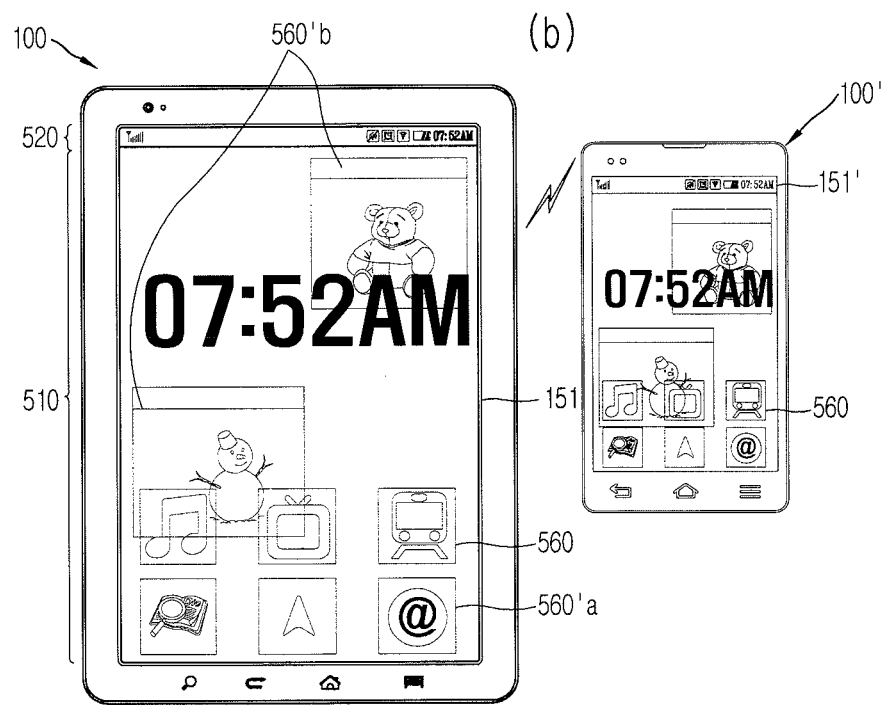

FIG. 14C
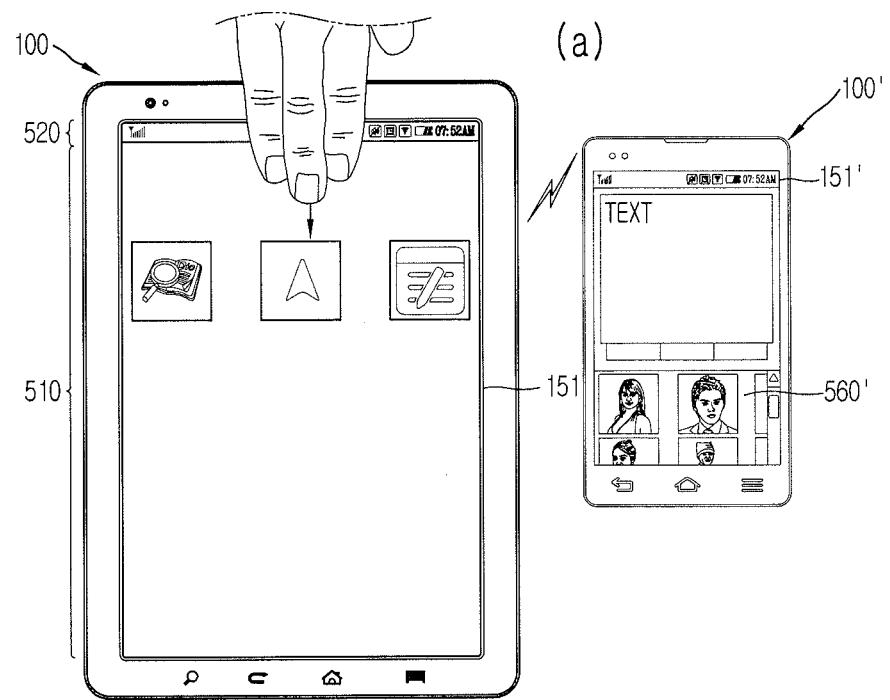
(a)
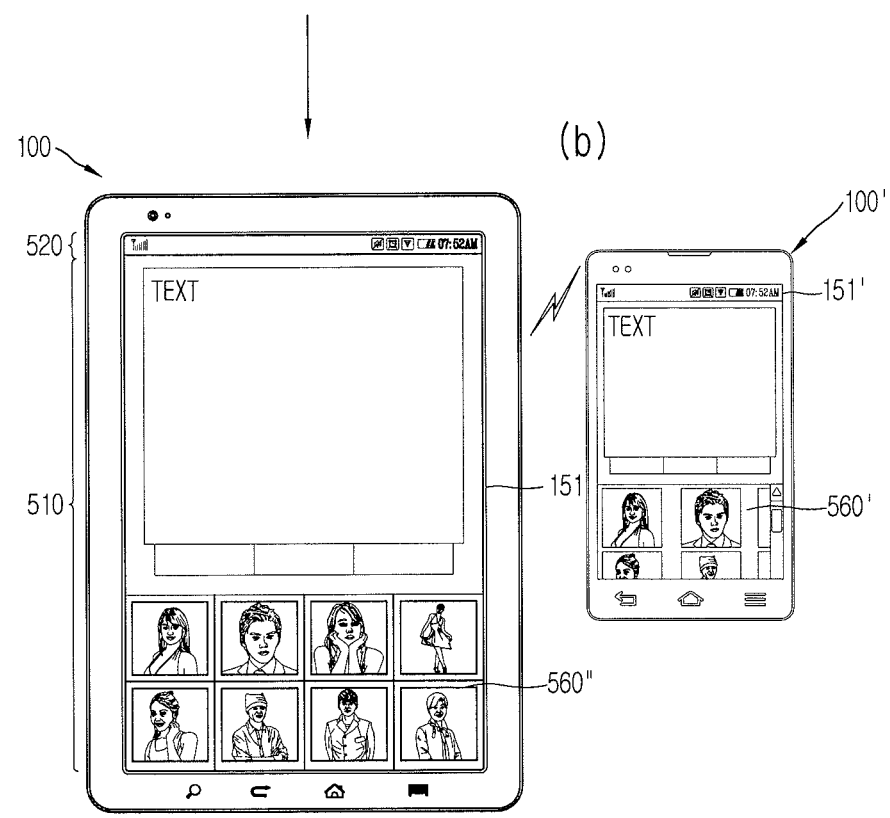
(b)

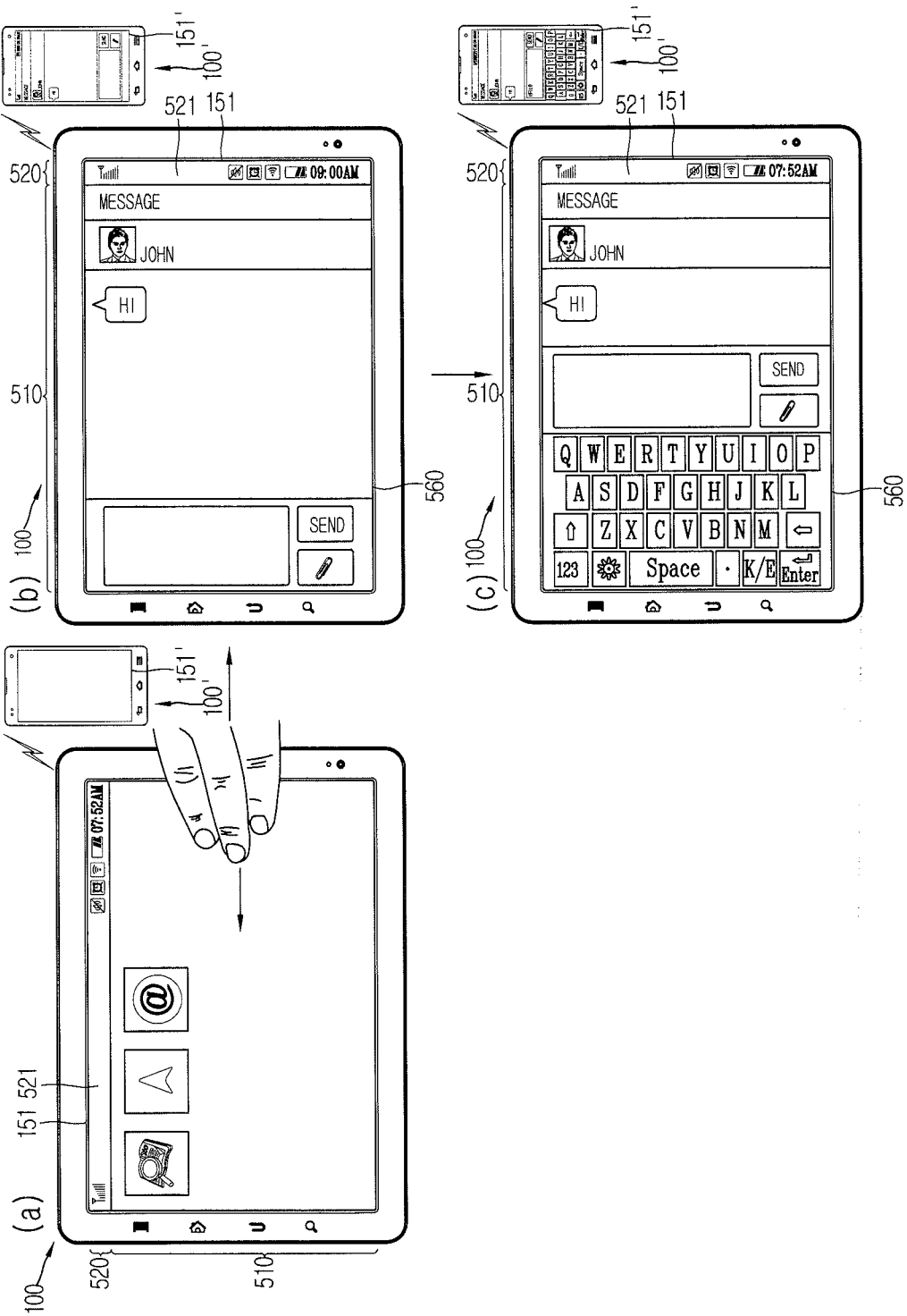

MOBILE TERMINAL AND METHOD OF CONTROLLING AN EXTERNAL MOBILE TERMINAL

CROSS-REFERENCE TO A RELATED APPLICATION

Pursuant to 35 U.S.C. §119(a), this application claims the benefit of earlier filing date and right of priority to U.S. Provisional Application No. 61/816,699, filed on Apr. 27, 2013, and Korean Application No. 10-2013-0048615, filed on Apr. 30, 2013, the contents of which are incorporated by reference herein in its entirety.

BACKGROUND OF THE INVENTION

1. Field of the Invention

The present invention relates to a mobile terminal connected to an external terminal.

2. Description of the Related Art

Terminals can be classified into two types, such as a mobile or portable terminal and a stationary terminal. Furthermore, the mobile terminal can be further classified into two types, such as a handheld terminal and a vehicle mount terminal. As it becomes multifunctional, for example, such a terminal is allowed to capture still images or moving images, play music or video files, play games, receive broadcast and the like, so as to be implemented as an integrated multimedia player.

In recent years, functions capable of allowing the user to enter information using a touch input on the display unit and storing it in various formats such as images, text and the like have been performed. Accordingly, the user can easily store information in the mobile terminal.

However, when information is entered from the outside, the information being entered is generally displayed on the display unit and thus the information being entered may be exposed to others. Accordingly, there is a problem in which the user information is exposed to others.

SUMMARY OF THE INVENTION

Accordingly, one object of the present invention is to address the above noted and other problems of the related art.

Another object of the present invention is to provide a mobile terminal for controlling the event of an external terminal.

In order to accomplish the foregoing task of the present invention, a mobile terminal connected to an external terminal according to an embodiment of the present invention may include a wireless communication unit configured to receive information on an event occurred in the external terminal, a display unit configured to display a notification image notifying the occurrence of the event by the information, and a controller configured to control the display unit to display a control screen for controlling the event in at least one region of the display unit based on a touch input applied to the notification image.

As an example associated with the present invention, the controller may execute an application corresponding to the event based on the control command, and the control screen may correspond to an execution screen of the application on which the event is activated.

As an example associated with the present invention, the control screen may include an authentication screen for receiving authentication information matched to an external terminal connected to the mobile terminal, and control the display unit to display the execution screen of the application associated with the event when the authentication information is entered to the authentication screen.

As an example associated with the present invention, the control screen may include virtual screen information to be displayed on the display unit 151' of the external terminal according to the event occurrence received by the wireless communication unit.

As an example associated with the present invention, the controller may display screen information for the installation of the application in the remaining region of the display unit when the activation of the application for the event is limited.

As an example associated with the present invention, the display unit may display a first status display window indicating information on the operating status of the mobile terminal in a preset region thereof, and the controller may control the display unit to switch the first status display window to a second status display window containing the notification image and information on the operating status of the external terminal upon receiving information on the event.

In order to accomplish the foregoing task of the present invention, a mobile terminal connected to an external terminal may include a display unit configured to display screen information and receive a touch input, a wireless communication unit configured to receive virtual screen information to be displayed on the display unit of the external terminal based on the touch input, and a controller configured to control the display unit to display a window containing the virtual screen information in one region of the display unit based on a reception region to which the touch input on the display unit is applied.

As an example associated with the present invention, when a window displayed on the display unit is displayed with a preset size, the controller may control the display unit to change the screen information displayed in the remaining region based on a control command applied to the window.

As an example associated with the present invention, the controller may execute an application previously installed in the external terminal based on a control command applied to the window and display a first execution screen of the application on the window, and control the display unit to display a second execution screen of the application associated with the application and previously installed in the mobile terminal in the remaining region.

As an example associated with the present invention, the controller may display additional information entered based on a control command applied to the window on the first execution screen, and control the display unit to display the additional information on the second execution screen.

As an example associated with the present invention, the controller may control the wireless communication unit to transmit a control signal for storing at least part of the content displayed based on a touch input applied to the window in the memory of the external terminal, and control the memory to store at least part of the content based on the touch input.

As an example associated with the present invention, the controller may detect an application associated with the content among applications installed in the mobile terminal, and control the memory to store the content in a storage region corresponding to the application.

As an example associated with the present invention, the controller may control the wireless communication unit to receive the information of the application installed in the external terminal based on a touch input applied to the window, and control the application to be installed using the information.

As an example associated with the present invention, the wireless communication unit may receive information on an event occurred in the external terminal, and the controller may control the display unit to display a notification image notifying the event occurrence in the preset region based on information on the event in the preset region.

As an example associated with the present invention, the controller may control the display unit to change content displayed on the window based on a touch input applied to the window, and control the wireless communication unit to transmit a control signal for the content to the external terminal to display the changed content on the display unit.

As an example associated with the present invention, the controller may control the display unit to display an active information window for displaying the active information of an application activated in the mobile terminal and the external terminal based on a touch input applied to the display unit.

As an example associated with the present invention, the controller may control the display unit to display an execution screen of the application corresponding to the active info oration in at least one of the window and the remaining region based on a touch input applied to one active information displayed on the active information window.

As an example associated with the present invention, the controller may control the display unit to display an input window configured to receive a control command in the other region based on a touch input applied to the window.

As an example associated with the present invention, the controller may control the display unit to change at least one of a size of the window and a location on the display unit based on a control command applied to one region of the window.

As an example associated with the present invention, the content may include information on an event occurred in the external terminal, and the controller may control the display unit to display a notification image for notifying the occurrence of the event in the preset region.

The present invention may receive a notification for an event occurred in the external terminal connected to the mobile terminal, and control the occurred event using the mobile terminal.

Accordingly, the event of the external terminal may be controlled using the mobile terminal without driving the external terminal, and the use of the mobile terminal can be used independently from the control of the event, thereby allowing the user to more easily perform a control on a plurality of terminals using one terminal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A and 5B are conceptual view illustrating a control method in FIG. 4 according to an embodiment;

FIGS. 6A and 6B are conceptual views illustrating a status display window displayed in a second display region during the occurrence of an event according to each embodiment;

FIGS. 7A through 7C are conceptual views illustrating a control screen based on event information according to various embodiments of the present invention;

FIGS. 8A and 8B are conceptual views illustrating a control method of displaying an authentication screen receiving authentication information for controlling the event;

FIGS. 10A through 10E are conceptual views illustrating a control method of outputting virtual screen information due to different control modes;

FIGS. 11A through 11I are conceptual views illustrating a control method of a mobile terminal based on a control command applied to a second window according to various embodiments;

FIGS. 14A through 14D are conceptual views illustrating a method of controlling the display unit of the external terminal based on a control command applied to the second and the third window.

DETAILED DESCRIPTION OF THE INVENTION

Figure 1:
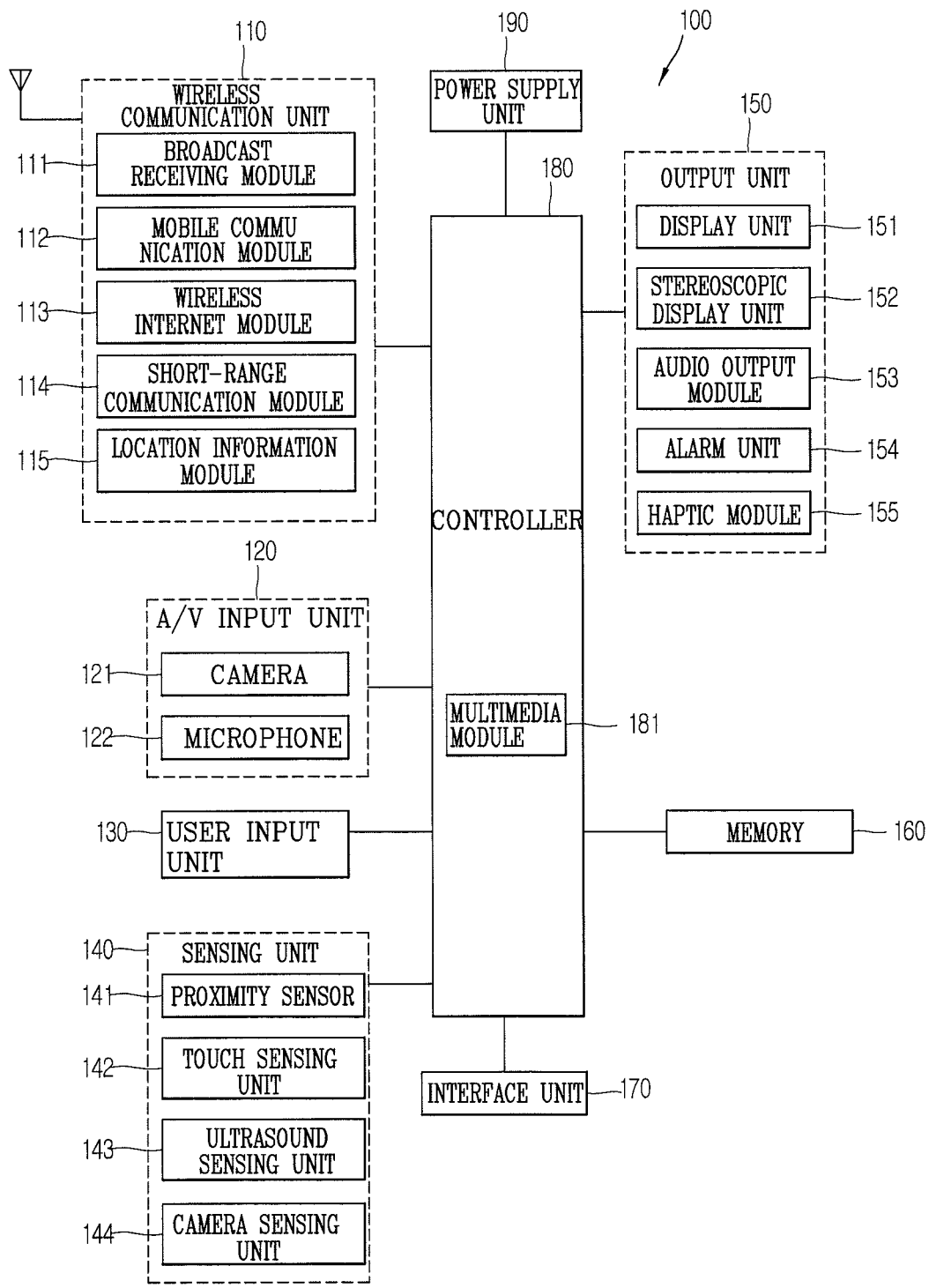
FIG. 1 is a block diagram illustrating a mobile terminal according to an embodiment of the present invention.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements of the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

A mobile terminal disclosed herein may include a portable phone, a smart phone, a laptop computer, a digital broadcast mobile terminal, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment of the present invention. In FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, a power supply unit 190, and the like. However, the mobile communication terminal may be implemented with greater or less number of elements than those illustrated elements.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems. Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFi) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display. Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image. Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile terminal 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this instance, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, an ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor. For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

In another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm unit 154 outputs signals notifying occurrence of events from the mobile terminal 100. The events occurring from the mobile terminal 100 may include call received, message received, key signal input, touch input, and so on. The alarm unit 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm unit 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input performed on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state. The power supply unit 190 receives external and internal power to provide power required for various components under the control of the controller 180.

Various embodiments described herein may be implemented in a computer or similar device readable medium using software, hardware, or any combination thereof.

For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some instances, such embodiments may be implemented in the controller 180 itself.

For a software implementation, the embodiments such as procedures or functions described in the present invention may be implemented with separate software modules. Each of the software modules may perform at least one function or operation described in the present invention. Software codes can be implemented by a software application written in any suitable programming language. The software codes may be stored in the memory 160 and executed by the controller 180.

Figure 2A:
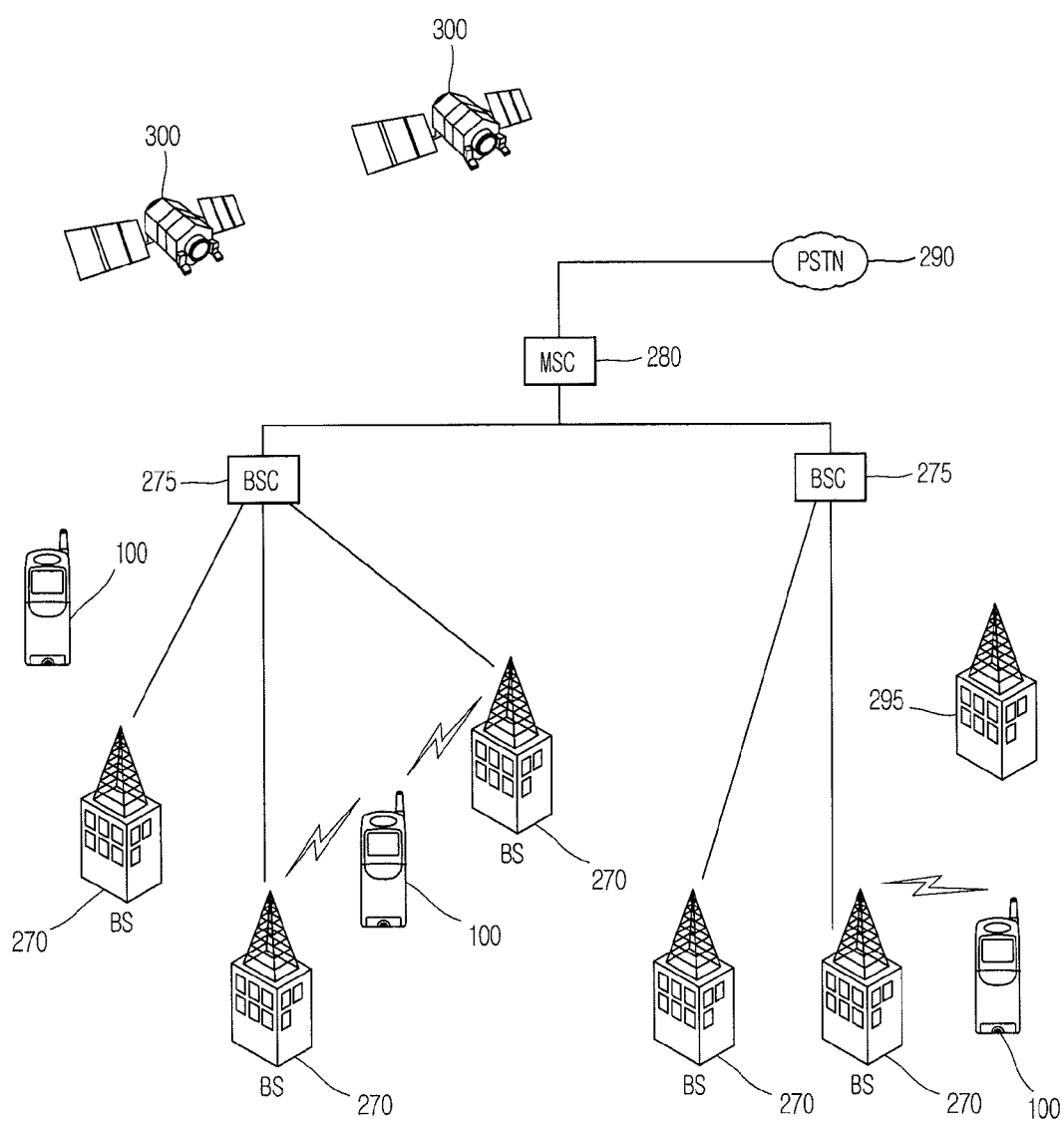
FIGS. 2A and 2B are conceptual views illustrating a communication system in which a mobile terminal According to an embodiment of the present invention is operable.
Figure 2B:
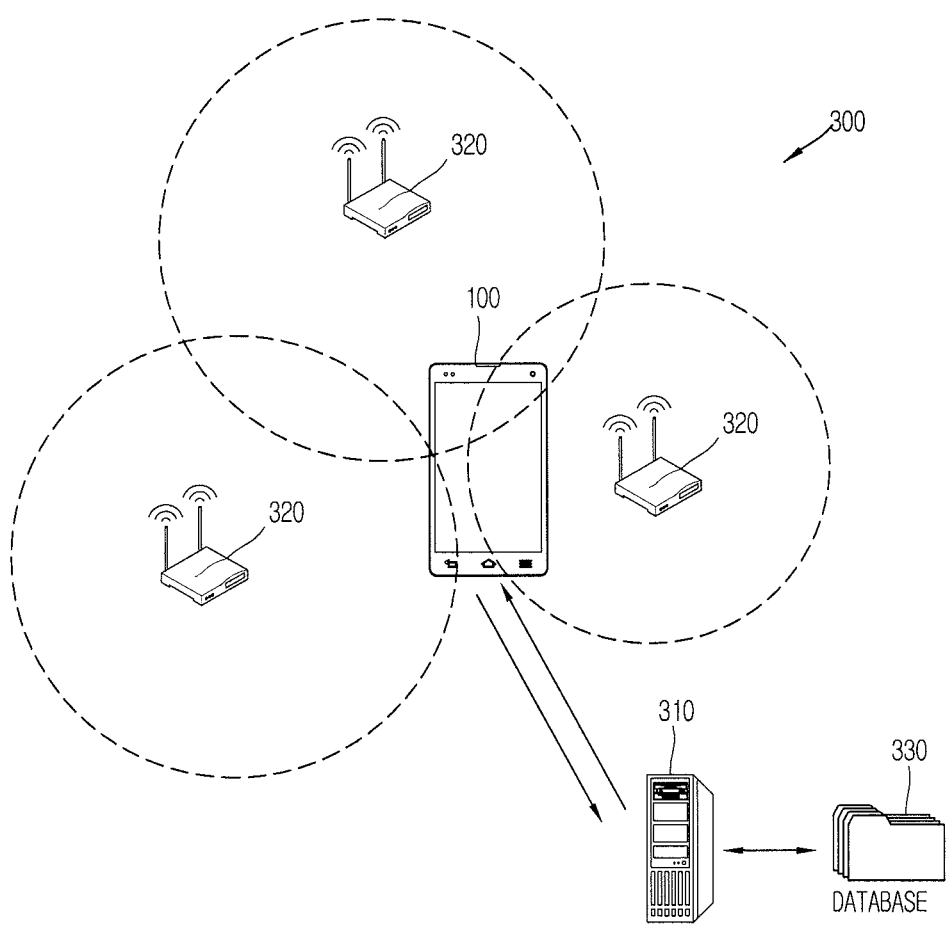

Next, a communication system that can be implemented through the mobile terminal 100 According to an embodiment of the present invention will be described. FIGS. 2A and 2B are conceptual views illustrating a communication system in which a mobile terminal 100 According to an embodiment of the present invention is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this instance, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft hand-offs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Figure 3A:
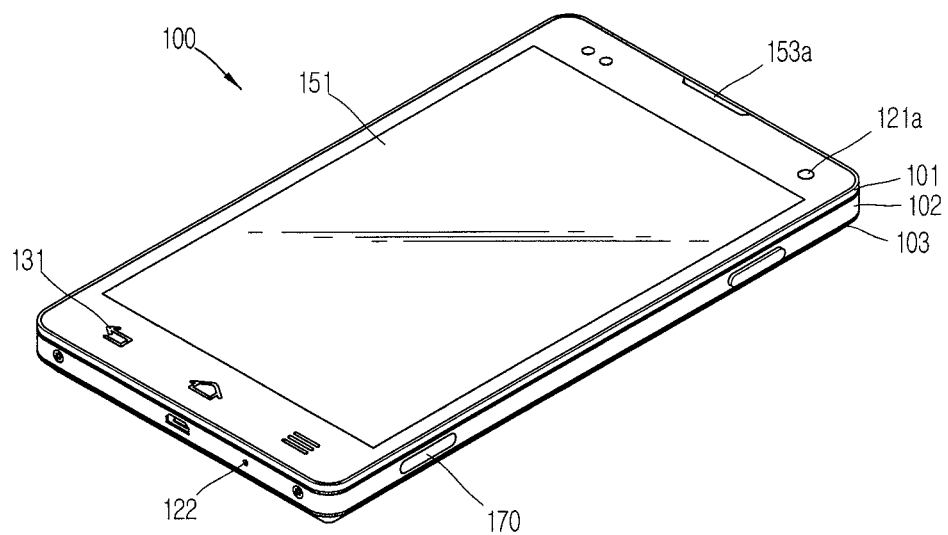
FIG. 3A is a front perspective view illustrating an example of a mobile terminal associated with the present invention.

Next, FIG. 3A is a front perspective view illustrating an example of the mobile terminal 100 associated with the present invention.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components are incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153*a*, a first camera 121*a*, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153*a* and the first camera 121*a* are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this instance, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

FIG. 3A illustrates the first manipulation unit 131 is a touch key, but the present invention is not limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
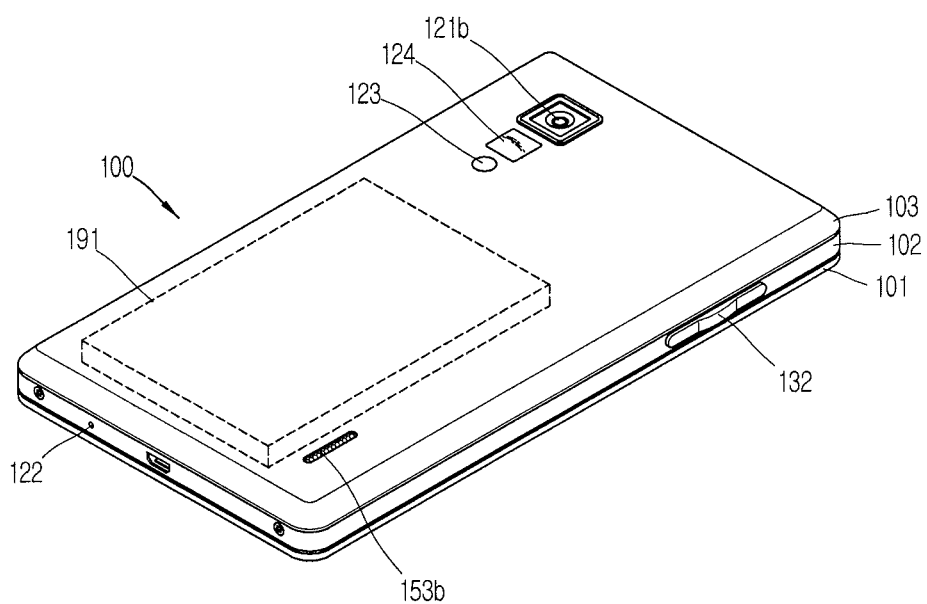
FIG. 3B is a rear perspective view illustrating a mobile terminal illustrated in FIG. 3A.

Next, FIG. 3B is a rear perspective view illustrating mobile terminal 100 illustrated in FIG. 3A. Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and pop-up ready manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna for receiving broadcast signals may be additionally disposed at a lateral surface of the terminal body in addition to an antenna for making a phone call or the like. The antenna constituting part of the broadcast receiving module 111 may be provided in the terminal body in a retractable manner.

A power supply unit 190 for supplying power to the mobile terminal 100 may be mounted on the terminal body. The power supply unit 190 may be incorporated into the terminal body, or may include a battery 191 configured in a detachable manner on the outside of the terminal body. FIG. 3B illustrates the battery cover 103 is combined with the rear case 102 to cover the battery 191, thereby restricting the battery 191 from being released and protecting the battery 191 from external shocks and foreign substances.

Furthermore, the extracted location information of the mobile terminal 100 may be transmitted to the mobile terminal 100 through the WiFi location determination server 310, thereby allowing the mobile terminal 100 to acquire location information.

Figure 4:
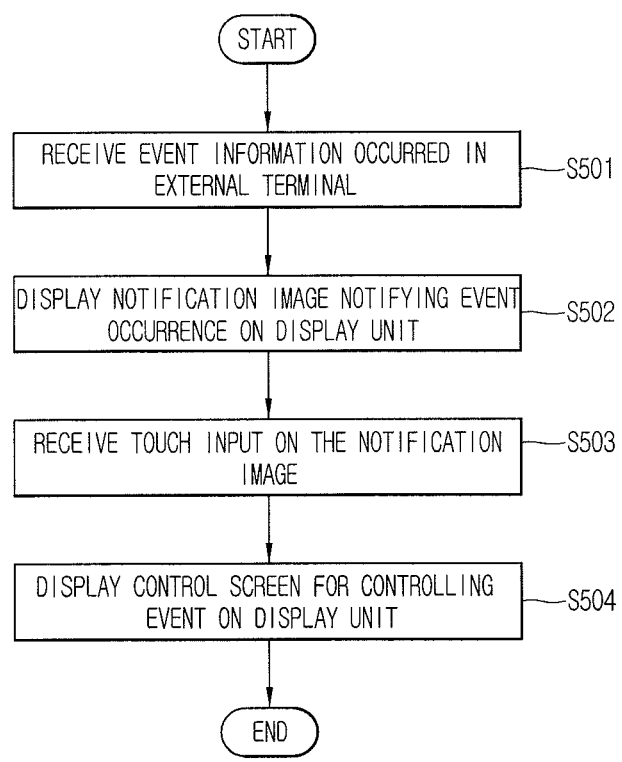
FIG. 4 is a flow chart illustrating a control method according to an embodiment of the present invention.

Next, FIG. 4 is a flow chart illustrating a control method according to an embodiment of the present invention, and FIGS. 5A and 5B are conceptual view illustrating a control method in FIG. 4 according to an embodiment of the present invention.

Referring to FIG. 5A(a), the display unit 151 may include a first display region 510 configured to display at least one content and a second display region 520 configured to display information on the operating status of the mobile terminal. The first display region 510 displays screen information containing at least one content. The screen information corresponds to a home screen page containing an icon configured to receive a touch input for activating an application, an execution screen of the application, a web browser screen, and the like. The controller 180 can control the screen information based on the user's touch input applied to the first display region 510.

A first status display window 521 configured to display at least one icon indicating information on the operating status of the mobile terminal 100 is formed in the second display region 520. The status display window 521 may be displayed in a bar shape displayed at one edge of the display unit.

For example, an icon indicating the current time, a remaining power amount of the power supply unit 190, an active status of WiFi, information on the set alarm, a notification mode of the mobile terminal 100, a communication service status, and the like may be displayed on the first status display window 521 displayed in the second display region 520. However, it is not limited to this, and an icon notifying it may be displayed by the user's setting and the occurrence of an event and the like.

For example, when a message or the like is received by the mobile terminal, the controller 180 can control the display unit to display an image (for example, an icon corresponding to a message application, etc.) notifying the reception of the message in the second display region 520.

The mobile terminal 100 according to an embodiment of the present invention is connected to an external terminal 100' in a wireless or wired manner. For example, the mobile terminal 100 may be connected to one external terminal 100' among a plurality of terminals in a wireless manner to transmit and receive radio signals. The external terminal 100' may be formed with the same or different type of the mobile terminal 100. The external terminal 100' may include a display unit 151' configured to display visual information.

Hereinafter, the external terminal 100' according to an embodiment of the present invention will be described to include the constituent elements of the mobile terminal in FIG. 1.

For example, an application previously installed in the mobile terminal 100 and the external terminal 100' may be activated, and they can be connected to each other in a wireless manner through the wireless communication unit 110. The mobile terminal 100 may pass through a control process of authenticating a device to recognize the external terminal 100' and transmit and receive radio signals through the wireless communication unit 110.

Referring to FIG. 4, the mobile terminal 100 connected to the external terminal 100' receives information on an event occurred in the external terminal 100' (S501). Here, the event may correspond to information received using the wireless communication unit of the external terminal 100' (for example, reception of a message, etc.), an alarm of the information stored in the storage unit of the external terminal 100' (for example, an alarm of time, an alarm of schedule recorded in a calendar application, etc.) and the like. When the event occurs in the external terminal 100', information on the event may be displayed on the display unit 151'.

The wireless communication unit 110 receives information on the event from the external terminal 100', and the controller 180 controls the display unit 151 to display a notification image 531 (FIG. 5B) notifying the event occurrence based on the information (S502).

Referring to FIG. 5B, the notification image 531 may be displayed in the second display region 520. When information on the event is received by the wireless communication unit 110, the controller 180 controls the display unit 151 to display a second status display window 522 containing information on the operating status of the external terminal 100' in the second display region 520. The first status display window 521 is switched to the second status display window 522 based on the reception of the information, and the notification image 531 is displayed on the second status display window 522.

The controller 180 can display the first status display window 521 and the second status display window 522 in different forms to be distinguished from each other. For example, the first and the second status display window 521, 522 may be displayed with different colors and brightness or displayed with different display methods of the information contained therein. On the other hand, the representative name of each terminal or the like may be displayed on the first and the second status display window 521, 522. Accordingly, the user can recognize a terminal corresponding to the information displayed on the display unit 151.

The second status display window 522 may correspond to information displayed in one region of the display unit 151' of the external terminal 100' when the event occurs, and the controller 180 controls the status display window of the external terminal 100' to be displayed on the display unit 151 of the mobile terminal when information on the event is received.

The controller 180 receives a touch input on the display unit 151 displayed on the notification image 531 (S503 and FIG. 5A(b)). Furthermore, the controller 180 controls the display unit 151 to display a control screen for controlling the event based on the control command (S504 and FIG. 5A(c)).

Here, a touch input applied to display the control screen is not limited to a touch input on the notification image 531. For example, the control screen may be displayed after a consecutive touch (for example, a touch input with a dragging scheme) from the second display region 520 displayed with the second status display window 522 containing the notification image 531 to the first display region 510.

On the other hand, the scheme of a touch input for displaying the control screen may be configured in a substantially similar manner to a control command for receiving the information of the operating status of the mobile terminal 100 contained in the first status display window 521 when the first status display window 521 is displayed in the second display region 520. In other words, the controller 180 controls the display unit 151 to display information corresponding to each terminal based on the same touch input according to the type of the status display window displayed in the second display region 520. The controller 180 can control the control screen to be displayed in at least one region of the display unit 151 according to the control command.

Referring to FIG. 5A(c), the controller 180 executes an application corresponding to the event based on the received information of the event. Furthermore, the controller 180 controls the display unit 151 to display an execution screen 511 of the application containing information on the event.

For example, when information on the event of message reception by the external terminal 100' is received by the wireless communication unit 110, the controller 180 executes a message application for displaying the received message. Furthermore, the controller 180 controls the display unit 151 to display content for the message on the execution screen 511 using information on the event.

In addition, the controller 180 may control the executed application based on a touch input applied to the execution screen 511. For example, the controller 180 can prepare a reply to the received message or send the reply to another terminal that has sent the received message. Furthermore, the controller 180 may control a function regardless of the event information to be performed using the application executed by the event information based on the user's another control command applied to the execution screen 511.

Also, the controller 180 controls the display unit 151 to switch the second status display window 522 to the first status display window 521 in the second display region 520 when the application is executed in the mobile terminal 100. In other words, the user can receive information on the status of the mobile terminal 100 while controlling an application using the event information of the external terminal 100'.

In other words, the controller can drive the mobile terminal 100 independently from the event control of the external terminal 100'. On the other hand, while an application executed in the mobile terminal 100 is controlled, the driving of the external terminal 100' may be suspended. In other words, the execution screen of an application executed in the mobile terminal 100 should not be necessarily displayed on the display unit 151' of the external terminal 100'.

According to an embodiment of the present invention, the controller 180 can receive a notification for an event occurred in the external terminal 100' connected to the mobile terminal 100 through the mobile terminal 100, and control the occurred event using the mobile terminal 100. Accordingly, the event of the external terminal 100' can be controlled without driving the external terminal 100', and the use of the mobile terminal 100 is enabled independently from the control of the event, and thus the user can more easily perform the control of a plurality of terminals using one terminal.

FIG. 5B is a conceptual view illustrating a control method of displaying a control screen according to the event occurrence according to another embodiment. Referring to FIG. 5A(b), the controller 180 can control the display unit 151 to display additional information 532 on the event occurrence based on a touch input applied to the second display region 520. The additional information 532 may be displayed in the first display region 510, and displayed adjacent to the notification image 531 of the second display region 520.

The additional information 532 may more specifically include information received at the mobile terminal 100 due to an event. For example, when a message is received at the external terminal 100', the additional information 532 may include the transmitting terminal and content of the message. When the occurred event is an alarm of schedule, the additional information may include a time of the recorded schedule and brief information on the schedule.

As illustrated in FIGS. 5B(a) and 5B(b), when a plurality of events occur in the mobile terminal 100, the controller 180 controls the display unit 151 to display additional information corresponding to each event to be output adjacent to one another.

Furthermore, the controller 180 can control the display unit 151 to display a control screen for controlling the applied event based on a touch input applied to one region of the additional information on the plurality of events. In other words, the controller 180 executes the message application based on the user's touch input applied to the additional information 532 corresponding to the message reception, and controls the display unit 151 to display the execution screen 511 containing the information of the received message.

Hereinafter, a control method of displaying information on an event when the event occurs in the external terminal 100' connected to the mobile terminal 100 will be described. In particular, FIGS. 6A and 6B are conceptual views illustrating a status display window displayed in a second display region during the occurrence of an event according to each embodiment.

Referring to FIG. 6A(a), when the mobile terminal 100 is connected to the external terminal 100', the controller 180 controls the display unit 151 to display part of the second status display window 522 in the second display region 520 along with the first status display window 521. For example, the second status display window 522 may be displayed in the form of being connected and folded to the first status display window 521.

Referring to FIG. 6A(b), when information on an event is received by the wireless communication unit 110, the controller 180 can control the display unit 151 to display the second status display window 522 in the second display region 520 as a whole. Furthermore, the controller 180 can control the display unit 151 to display part of the first status display window 521 in the second display region 520.

Referring to FIGS. 6A(b) and 6A(c), subsequent to receiving information on the event, the controller 180 can control the display unit 151 to switch the second status display window 522 to the first status display window 521 based on a touch input applied to the second display region 520. In other words, the user can apply a touch input to the second display region 520 to receive the operating status of the mobile terminal 100 or the external terminal. For example, the touch input may correspond to a touch input with a dragging scheme consecutively applied within the second display region 520.

On the other hand, as illustrated in FIGS. 6A(b) and 6A(d), the controller 180 can control the display unit 151 to display the additional information 532 on the event information based on a touch input applied to the second display region 520 in a state that the second status display window 522 is displayed in the second display region 520.

A status display window displayed in another format when the event information is received will be described with reference to FIG. 6B. When the first status display window 521 of the mobile terminal 100 is displayed in the second display region 520, and the event information is received by the wireless communication unit 110, the controller 180 controls the display unit 151 to partition the second display region 520 into two regions.

As illustrated in FIG. 6B(b), the controller 180 controls the display unit 151 to display the first and the second status display window 521, 522, respectively, in the partitioned second display region 520. For example, when the first and the second status display window 521, 522 are in a bar shape, the first and the second status display window 521, 522 may be displayed in a length modified state.

On the other hand, referring to FIG. 6B(c), the controller 180 can control the display unit 151 to display content 522' on the event along with the first status display window 521 in part of the partitioned second display region 520 based on the reception of the event information.

FIGS. 7A through 7C are conceptual views illustrating a control screen based on event information according to various embodiments of the present invention.

A control method of display a control screen based on the event information in one region on the display unit 151 will be described with reference to FIG. 7A. Referring to FIG. 7A(a), the controller 180 controls the display unit 151 to display the second status display window 522 containing the notification image 531 in the second display region 520. Furthermore, in FIG. 7B, the controller 180 controls the display unit 151 to display a first icon 533 for receiving a control command of displaying the screen information in a preset partitioned region of the first display region in the second display region 520.

Referring to FIGS. 7A(a) and 7A(b), the controller 180 partitions the first display region 510 into a first and a second region 510a, 510b based on the touch input applied to the icon 531. For example, either one of the first or the second region 510a, 510b may be preferably partitioned to correspond to a size containing the display unit 151' of the external terminal 100'. The controller 180 also displays an execution screen 512 (virtual keyboard, etc.) for interacting with the text message session. FIG. 7A(c) illustrates the controller 180 displaying an execution screen 511 for interacting with a chatting session when the chatting session icon in selected in FIG. 7A(a).

That is, the controller 180 controls the display unit 151 to display a control screen corresponding to the event in the second region 510b. However, a region displayed with the control screen may be displayed in either one of the first and the second region 510a, 510b.

Here, the control screen corresponds to the execution screen of an application corresponding to the event. The controller 180 controls the wireless communication unit 110 to transmit radio signals for activating the application in the external terminal 100' to the external terminal 100' based on a control command applied to the selected icon. Furthermore, the controller 180 receives radio signals for virtual screen information to be displayed on the display unit 151' of the external terminal 100' by the execution of the application through the wireless communication unit 110. In other words, the virtual screen information corresponds to an execution screen of the executed application when it is executed on the external terminal 100'.

In other words, the controller 180 controls the display unit 151 to display virtual screen information 512 received from the external terminal 100' in the second region 510b. Furthermore, the controller 180 can control the display unit 151 to display a hardware shape of the external terminal 100' in the second region 510b, but it is not limited to this. Accordingly, the user can receive the virtual screen information of the external terminal 100' without activating the display unit 151' of the external terminal 100'.

Furthermore, the controller 180 can control the application based on a touch input applied to the second region 510b. For example, when an event occurred in the external terminal 100' is the reception of a message, the controller 180 may activate the message application in the external terminal 100', and send a reply to the received message based on a touch input applied to the display unit 151 based on a touch input applied to the display unit 151.

When preset content is displayed on the display unit 151 prior to receiving the event occurrence, the controller 180 can control the display unit 151 to display the virtual screen information 512 to cover at least part of the content. On the contrary, the controller 180 can control the display unit 151 to display the content in the first region 510a and display the virtual screen information 512 in the second region 510b.

In addition, control due to the display unit 151 may be stored in the external terminal 100', and the controlled status may be checked later by the external terminal 100'. In other words, the user can receive an event occurred in the external terminal 100' without using the external terminal 100' as well as perform control on the event using the screen information of the external terminal 100' according to the event.

On the other hand, the controller 180 may execute an application corresponding to the event in the mobile terminal 100 based on a touch input applied to the notification image 531, and control the display unit 151 to display the execution screen 511 of the application. It may include a substantially similar configuration to the control method of FIG. 5A, and thus the description thereof will be omitted.

According to the present embodiment, when the occurrence of an event is recognized by the mobile terminal 100, the user can selectively apply a touch input to a notification image or first icon according to the occurrence of the event to execute an application in the mobile terminal 100 or external terminal 100' to control the event.

A control method when the activation of an application corresponding to the event is limited in the mobile terminal 100 will be described with reference to FIG. 7B. Referring to FIG. 7B(a), when information on the event is received from the external terminal 100', the controller 180 searches an application corresponding to the event to be executed in the mobile terminal 100.

When there is an application corresponding to the event, the controller 180 controls the display unit 151 to display a representative icon of the application as the notification image 531. However, when the execution of the application is limited in the mobile terminal 100, the controller 180 controls the display unit 151 to display a second icon 534. For example, when the application is not installed in the mobile terminal 100, or when the download of a program by one or more accounts is limited by an application service provider.

Referring to FIG. 7B(b), when a touch input applied to the second icon 534 is received, the controller 180 controls the display unit 151 to display the additional information 532 containing a notification for the occurrence of an event and the first icon 533 for displaying and the screen information of the external terminal 100' corresponding to the event in the first display region 510.

Referring to FIG. 7B(c), the controller 180 controls the display unit 151 to display the screen information 513 of the external terminal 100' based on a touch input applied to the additional information 532 and the first icon 533. In other words, the controller 180 transmits a radio signal for partitioning the first display region 510 into the first and the second 510a, 510b based on the touch input, and executing an application corresponding to the event in the external terminal 100'.

The controller 180 can control the display unit 151 to receive the active screen 513 of the application executed in the external terminal 100' and display it in the second region 510b. Here, the active screen 513 may correspond to a loading screen for the execution of an application, a log-in screen, an input screen for receiving a password set to each application, and the like.

However, it is not limited to this, and the controller 180 can control the display unit 151 to display virtual screen information 512 (refer to FIG. 7A) corresponding to the execution screen of the application containing the event information in the second region 510b.

On the other hand, the controller 180 controls the display unit 151 to display installation screen information 541 providing information on an application to install the application corresponding to the event in the first region 510a. For example, the installation screen information 541 may include content capable of executing information, purchase and installation for an application.

In addition, when the installation of the application is disabled in the mobile terminal 100, information on this may be displayed in the first region 510a.

According to the present embodiment, when the execution of an application for controlling the event is disabled in the mobile terminal 100, the controller 180 may automatically search an application corresponding to the event and propose the installation, and thus the user can install an application for the control of the event in more convenient manner.

A control method of displaying screen information for controlling the event based on a touch input applied to the second status display window 522 will be described with reference to FIG. 7C.

Referring to FIG. 7C(a), when the occurrence of the event is received, the controller 180 displays the second status display window 522 containing the notification image 531 of the event in the second display region 520.

The controller 180 partitions the first display region 510 into the first and the second region 510a, 510b based on a touch input applied to the second status display window 522. The touch input may be a dragging touch scheme consecutively applied from the second status display window 522 to the first display region 510.

The controller 180 searches an application corresponding to the event and controls the display unit 151 to display the execution screen 511 of the application containing the information of the event.

Furthermore, the controller 180 controls the wireless communication unit 110 to transmit radio signals for executing an application corresponding to the event to the external terminal 100', and receive the virtual screen information of the display unit 151' of the external terminal 100' according to the execution of the application. Furthermore, the controller 180 controls the display unit 151 to display the virtual screen information 512.

In addition, the controller 180 can control the application based on a touch input applied to the first and the second region 510a, 510b. Furthermore, the controller 180 can control one of the first and the second region 510a, 510b to be activated based on a touch input applied to the first and the second region 510a, 510b.

When a plurality of events occur, the controller 180 may selectively display an application corresponding to each event on the external terminal 100' and mobile terminal 100 and thus control the display unit 151 to display each execution screen in the first and the second region 510a, 510b.

For example, when the execution of an application for controlling a first event among two event occurred in the external terminal 100' is limited in the mobile terminal 100, the controller 180 executes an application corresponding to the first event in the mobile terminal 100 and controls the display unit 151 to display an execution screen of the application corresponding to the first event. Furthermore, the controller 180 can control the display unit 151 to display an execution screen of the application for a second event in the first region 510a. Accordingly, the user can perform control on a plurality of events on the display unit 151.

FIGS. 8A and 8B are conceptual views illustrating a control method of displaying an authentication screen receiving authentication information for controlling the event.

Referring to FIG. 8A(a), the controller 180 controls the display unit 151 to display the authentication screen 573 in a region such as the first region 510a based on a touch input applied to the notification image 531. The authentication screen may be implemented with an input window for entering text or forming a predetermined pattern.

FIGS. 8A(b) and 8A(c), when the authentication information is entered to the authentication screen 573, the controller 180 controls the display unit 151 to display the virtual screen information 512 when executing an application corresponding to the event in the external terminal 100'.

A control method of displaying an authentication screen for receiving authentication information for controlling the event will be described with reference to FIG. 8B.

Referring to FIG. 8B(a), the controller 180 displays the second status display window 522 in the second display region 520 by event information occurred in the external terminal 100'. The controller 180 controls the display unit 151 to partition the first display region 510 into the first and the second region 510a, 510b based on a touch input applied to the second status display window 522. The controller 180 controls the display unit 151 to display control screen for controlling the event in the second region 510b.

Referring to FIG. 8B(b), the control screen may correspond to an authentication screen 514 for receiving authentication information. For example, the authentication screen 514 may be correspond to a screen to which authentication information is entered by the user when the display unit 151' of the external terminal 100' is activated or authentication screen for receiving authentication information when an application corresponding to the event is activated.

In other words, the authentication information may be formed according to information on the virtual screen of the external terminal 100', and the authentication information may correspond to pattern information and the like entered based on text or a touch input.

Referring to FIGS. 8B(a) and 8B(b), when preset authentication information is entered based on a touch input applied to the second region 510b for displaying the authentication screen 514, the controller 180 controls the display unit 151 to display virtual screen information 512 when executing an application corresponding to the event in the external terminal 100'.

Furthermore, the controller 180 can control the display unit 151 to display a plurality of different authentication screens according to an application corresponding to event.

On the other hand, referring to FIGS. 8B(b) and 8B(d), when preset authentication information is entered based on a touch input applied to the second region 510b for displaying the authentication screen 514, the controller 180 executes an application corresponding to the event in the mobile terminal 100. Furthermore, the controller 180 controls the display unit 151 to display the execution screen 511 of the application in the first display region 510.

However, a region displayed with the execution screen 511 is not limited to this, and the controller 180 can control the display unit 151 to display the execution screen 511 in at least one of the first and the second region 510a, 510b.

According to the present embodiment, the controller 180 may determine whether or not the user has the use authority of the external terminal 100' to control the event of the external terminal 100' connected to the mobile terminal 100 and control the application of the external terminal 100'. Accordingly, it may be possible to prevent the external terminal 100' from being controlled by the user with no authority.

When an event occurs in the external terminal 100' connected to the mobile terminal 100, the present invention may include a control method of displaying screen information thereof, and virtual screen information displayed in one region of the display unit 151 according to an embodiment to control the event on the external terminal 100' has been described.

Hereinafter, a control method of the display unit 151 when the virtual screen information is displayed according to different modes on the display unit 151 will be described in detail.

Figure 9:
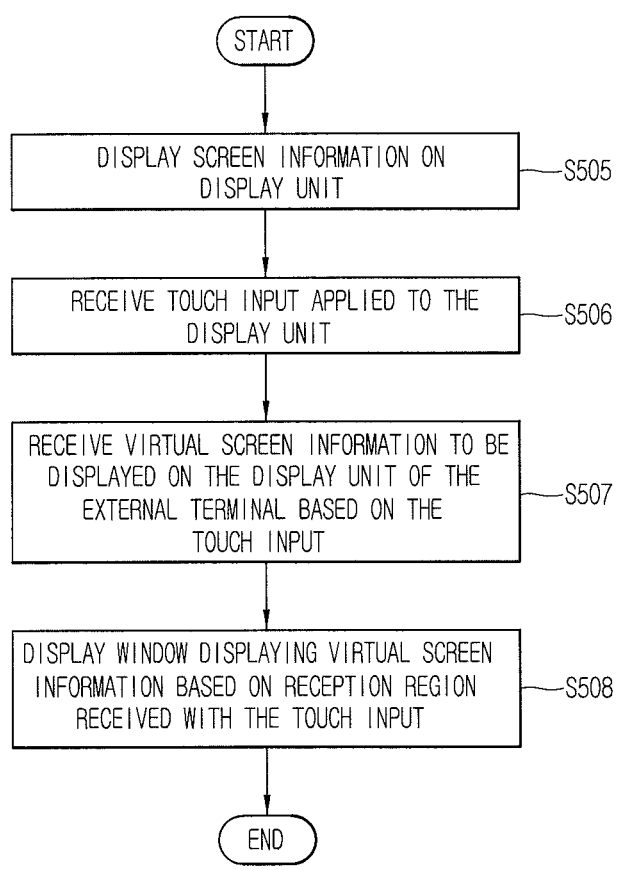
FIG. 9 is a flow chart illustrating a control method of outputting a window for displaying virtual screen information according to an embodiment of the present invention.

FIG. 9 is a flow chart illustrating a control method of outputting a window for displaying virtual screen information according to an embodiment of the present invention. FIGS. 10A through 10D are conceptual views illustrating a control method of outputting virtual screen information due to different control modes.

A control method of displaying a first through a third window for displaying virtual screen information based on a touch input applied to different regions of the display unit 151 will be described with reference to FIGS. 9 and 10A.

Here, the virtual screen information indicates screen information to be displayed on the display unit 151' of the external terminal 100' by the user's control command. The user can enter a control command to the virtual screen information displayed on the display unit 151 to control the external terminal 100'. However, the mobile terminal 100 may not be required to be driven or the display unit 151' of the external terminal 100' may not be required to be activated while controlling the external terminal 100' using virtual screen information displayed on the display unit 151. In other words, the user can control the external terminal 100' on the mobile terminal 100 using the virtual screen information.

According to an embodiment of the present invention, the display unit 151 may be controlled in a different manner based on a touch input applied to the first through the third window 540, 550, 560 displaying the substantially same virtual screen information.

The display unit 151 can display preset screen information. The screen information may include at least one content and there is no limit in the type of content (S505). The display unit 151 receives a touch input applied to one region thereof and controls the wireless communication unit 110 to receive virtual screen information displayed on the display unit 151' of the external terminal 100' based on the touch input (S506, and S507).

Here, the touch input may correspond to a control command applied to receive an event of the external terminal 100' and control the event. In other words, virtual screen information may correspond to an execution screen of the application to be displayed on the mobile terminal 100 to control the event, or the like.

However, it is not limited to this, but also can correspond to when a control command is not applied to the external terminal 100' based on the touch input, for example, a home screen page containing icons for activating applications or the like.

The controller 180 can control the display unit 151 to display at least one of the first through the third window based on a reception region in which the touch input on the display unit 151 is received. Hereinafter, the first through the third window displayed according to the reception region will be described.

Referring to FIGS. 10A(a) and 10A(b), when an event occurs in the external terminal 100', the controller 180 controls the display unit 151 to display the notification image 535 notifying the event occurrence in the second display region 520.

The controller 180 controls the display unit 151 to display the first window 540 displaying the virtual screen information based on the touch input applied to the notification image 535 on the first display region 510. As illustrated in the drawing, the virtual screen information may correspond to an execution screen of the application displayed when the application corresponding to the event is executed in the mobile terminal 100.

In addition, the controller 180 can control the display unit 151 to display the first window 540 by a touch input applied to the first status display window 521 displayed in the second display region 520. The first window 540 is displayed in one region of the first display region 510. The first window 540 may be formed at a location adjacent to the second display region 520.

When preset content has been displayed on the display unit 151, the first window 540 may be displayed to cover at least part of the content. The transparency of the first window 540 may be controlled according to the user's setting.

The controller 180 can control the display unit 151 to control virtual screen information displayed on the first window 540 based on a touch input applied to one region on the display unit 151 displayed with the first window 540. However, the control may be limited according to the user's setting and the displayed size of the first window 540.

Referring to FIGS. 10A(a) and 10A(c), the controller 180 can control the display unit 151 to display the second window 550 based on a touch input applied to an edge of the first display region 510 by the one object (user's finger).

The controller 180 can control the display unit 151 to partition the first display region 510 into the first and the second region 510a, 510b when the touch input is applied. The description of the first and the second region 510a, 510b will be omitted. The second window 550 may be displayed in the substantially same size as that of the external terminal 100'.

The controller 180 can control the virtual screen information of the external terminal 100' based on a touch input applied to the second region 510b. In other words, a control command by a touch input applied to the second region 510b may control the external terminal 100' and receive information on the control of the external terminal 100' at the mobile terminal 100.

On the other hand, the controller 180 may independently control the mobile terminal 100 based on a touch input applied to the first region 510a. For example, the controller 180 may select an icon corresponding to an application displayed in the first region 510a to execute the application.

Furthermore, when the second window 550 is displayed on the display unit 151, the controller 180 can control screen information displayed in the first display region 510 based on a control command applied to the second window 550. The features thereof will be described below with reference to FIGS. 11A through 11G.

Referring to FIGS. 10A(a) and 10A(d), when a touch input due to three objects (for example, the user's three fingers) is applied, the controller 180 controls the display unit 151 to display a third window 560 containing the virtual screen information in the first display region 510. When the three objects apply a consecutive touch input to the first display region 510, the controller 180 can control the display unit 151 to display the third window 560.

On the other hand, the controller 180 controls the display unit 151 to display the first status display window 521 for displaying the operating status of the mobile terminal 100 in the second display region 520.

The controller 180 can control the external terminal 100' based on a control command applied to the third window 560. In other words, the controller 180 controls the display unit 151 to display a different shape of window in a different region based on a region to which a touch input on the display unit 151 is applied and the shape of an object to which the touch input is applied. However, the shape of the reception region and object for displaying the different window may not be necessarily limited to the foregoing description and may be also changed by the user's setting.

The controller 180 can control the sensing unit 140 to sense the rotation and location of the mobile terminal. For example, when the mobile terminal is rotated to be located in a vertical direction when the second window 550 is displayed, the controller 180 can control the display unit 151 to switch the display direction of the second window 550 to the vertical direction. In this instance, the second window 550 is displayed in the upper or lower portion of the display unit 151 located in a vertical direction.

On the other hand, when the mobile terminal is rotated to be located in a vertical direction, the controller 180 may partition the display unit 151 in a vertical direction, and display it in the preset partitioned region (right or left) of the display unit 151.

A control method of changing the displayed window will be described with reference to FIG. 10B. Referring to FIGS. 10B(a) and 10B(b), the first window 540 is displayed in one region on the display unit 151. The controller 180 can control the display unit 151 to change the size of the first window 540 based on a touch input applied to the first window 540.

Referring to FIGS. 10B(b) and 10B(c), the controller 180 can control the display unit 151 to switch the first window 540 to the second window 550 based on a touch input applied to the first window 540. For example, when the size of the first window 540 is becoming larger than a preset reference size, the controller 180 can control the display unit 151 to display the first window 540 by changing it to the second window 550. Here, the preset size may correspond to the substantially same size as that of the external terminal 100'. However, it is not limited to this, and the preset size may be defined according to the user's setting.

Referring to FIGS. 10B(c) and 10B(d), the controller 180 may modify the size of the second window 550 based on a touch input applied to the second window 550 or control the display unit 151 to display the second window 550 by changing it to the third window 560.

For example, a touch input applied to the second window 550 may correspond to a touch input with a dragging scheme moved in one direction from an edge of the second window 550 on the display unit 151. In addition, the controller 180 may change the third window 560 to the first or the second window 540, 550 based on a touch input applied to the third window 560.

The virtual screen information displayed on the first through the third window 540, 550, 560 may be the substantially same, and the user can modify a window displayed on the display unit 151 according to his or her convenience.

Figure 10C:
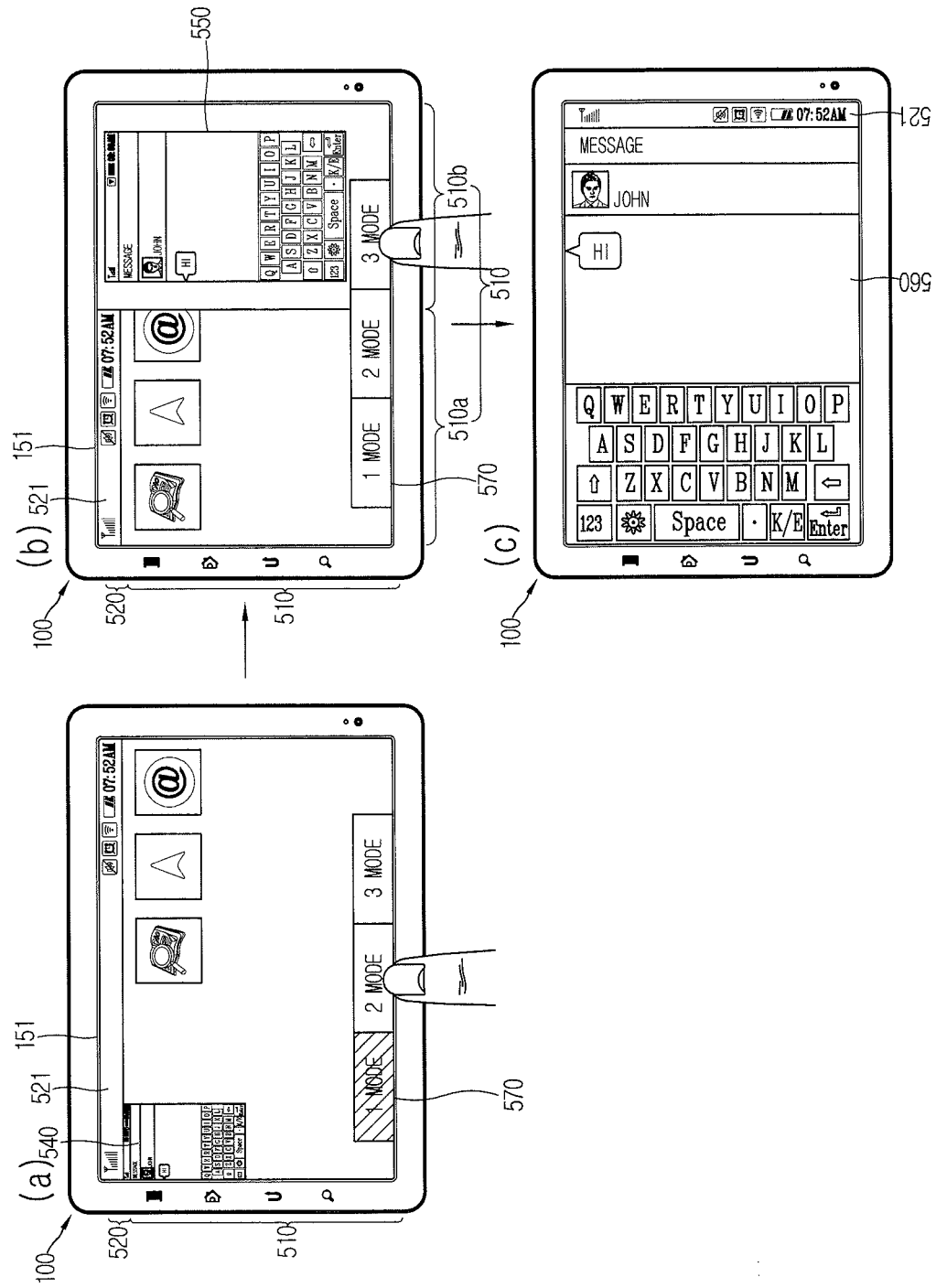

FIG. 10C is a conceptual view illustrating a control method of modifying a window according to another embodiment. Referring to FIG. 10C(a), the display unit 151 displays each graphic image 570 on the first through the third window 540, 550, 560 in one region thereof.

The controller 180 can control the display unit 151 to display the first, the second or the third window 540, 550, 560 for displaying the substantially same virtual screen information based on a touch input applied to the graphic image 570. On the other hand, when the third window 560 displayed in the first display region 510 as a whole is displayed, the controller 180 can control the display unit 151 to limit the display of the graphic image 570 based on the user's setting.

A control method of changing a location displayed with the window will be described with reference to FIG. 10D. Referring to FIG. 10D, the controller 180 can control the display unit 151 to change a region displayed with the first window 540 based on a touch input applied to the first window 540 for displaying the virtual screen information of the external terminal 100'.

The first window 540 may include an icon for moving the first window 540. The controller 180 may move the first window 540 based on a touch input applied to the icon, and a touch input applied to the icon controls the display unit 151 to limit the control of the virtual screen information.

Figure 10E:
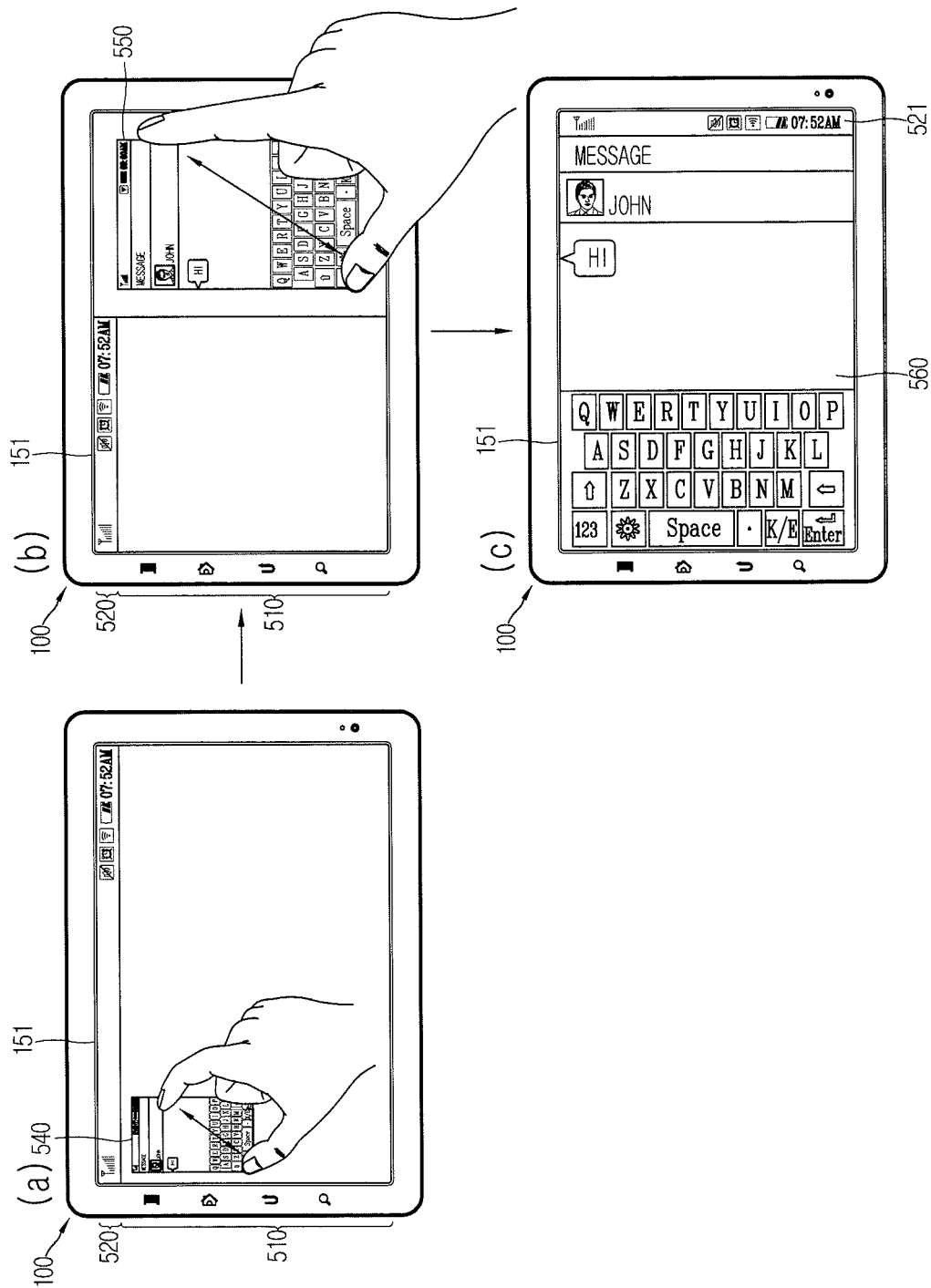

A control method of changing the displayed window will be described with reference to FIG. 10E. The controller 180 according to the present embodiment controls the display unit 151 to display the first, the second or the third window 540, 550, 560 displayed on the display unit 151 by switching them to one another based on a touch input applied substantially at the same time to one region of the display unit 151.

For example, when a consecutive touch input (pinch in) applied at the same time to the second window 550, and moved in the direction of being away from each other is sensed, the controller 180 can control the display unit 151 to switch the second window 550 to the third window 560.

On the contrary, when a consecutive touch input (pinch in) applied at the same time to the second window 550, and moved in the direction of being closer to each other is sensed, the controller 180 can control the display unit 151 to switch the second window 550 to the first window 540. Accordingly, the user can more easily modify a window based on a touch input applied to the window.

Next, FIGS. 11A through 11I are conceptual views illustrating a control method of a mobile terminal based on a control command applied to a second window according to various embodiments. When the second window 550 is displayed in the second region 510b, the controller 180 can control the screen information of the first region 510a by a control command applied to the second region 510b.

Figure 11A:
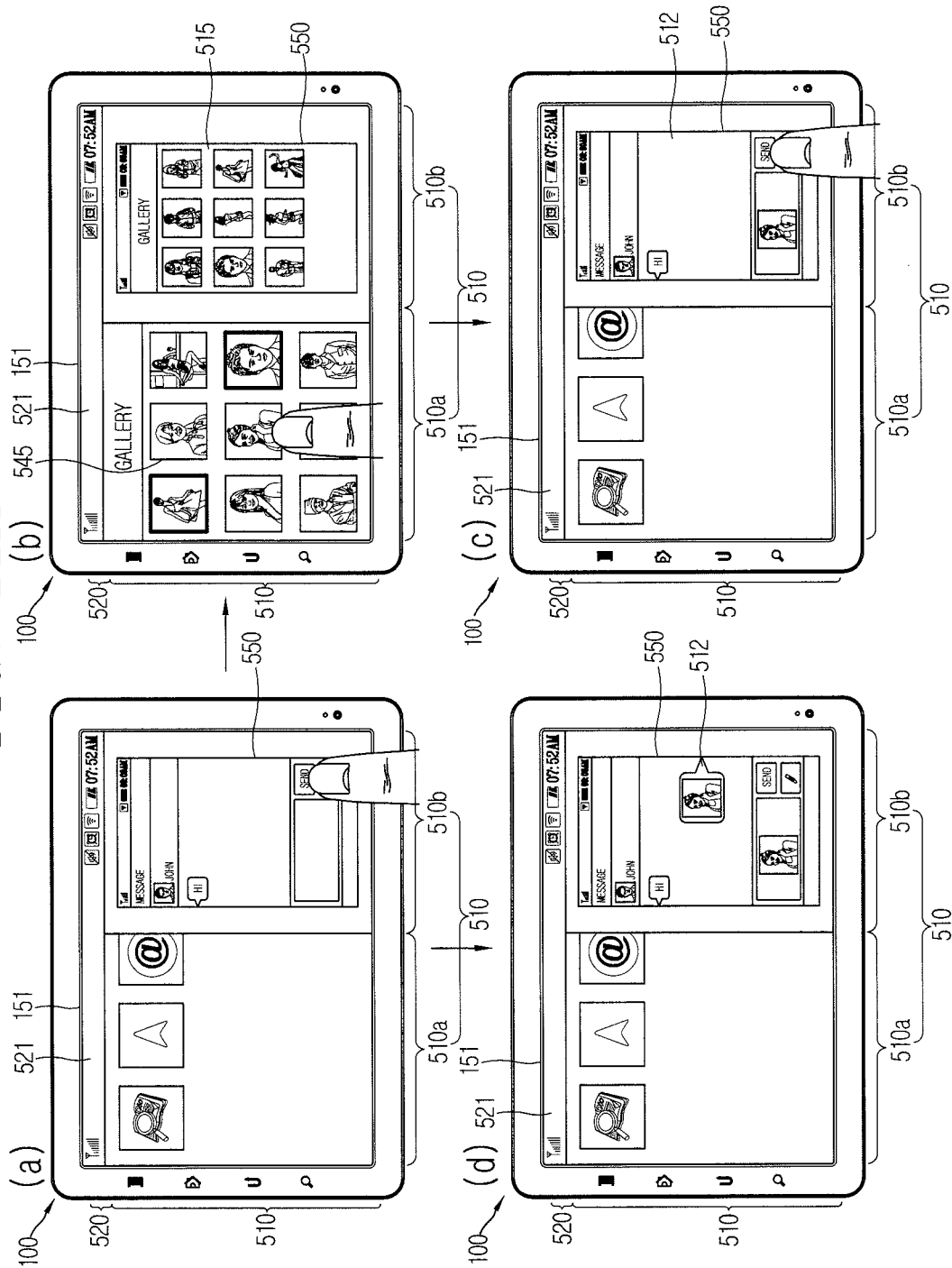

Referring to FIG. 11A, a control method of controlling the virtual screen information using content stored in the memory 160 of the mobile terminal 100 will be described with reference to FIG. 11A. Referring to FIG. 11A(a), the display unit 151 displays the second window 550 for displaying the execution screen 512 of the message application in the external terminal 100' in the second region 510b.

The controller 180 controls the display unit 151 to switch the execution screen 512 to the first screen information 515 based on a control command applied to the second window 550. For example, the execution screen 512 can be an execution screen of the message application and a touch input is applied to one region of the execution screen to append an image to the counterpart. The first screen information 515 may correspond to an execution screen of a gallery application for selecting the image.

A plurality of images contained in the first screen information 515 correspond to contents stored in the memory of the external terminal 100'. In other words, when a touch input is applied to the second window 550, the controller 180 controls the wireless communication unit 110 to receive the corresponding information from the external terminal 100'.

On the other hand, the controller 180 can control the display unit 151 to display a first page 545 which is an execution screen of the application associated with the first screen information 515 in the second region 510b. For example, the controller 180 may execute the gallery application of the mobile terminal 100 based on a touch input applied to the second window 550, and control the display unit 151 to display the execution screen of the gallery application containing images stored in the memory 160 of the mobile terminal 100.

On the other hand, the controller 180 can control the display unit 151 to display the substantially same information as that contained in the first screen information 515 among information contained in the first page 545. For example, when an image stored in the external terminal 100' is stored in the mobile terminal 100, the image may be displayed in a highlighted manner on the display unit 151.

Referring to FIGS. 11A(b) and 11A(c), the controller 180 may append the image to a send message based on a touch input applied to the display unit 151. For example, the controller 180 may add one image to the execution screen 512 based on a touch input applied to the one image contained in the first page 545.

The one image is stored in at least one of the mobile terminal 100 and the external terminal 100'. Furthermore, the image contained in the first screen information 515 may be added and displayed on the execution screen 512. On the other hand, when the first screen information 515 is switched to the execution screen 512, the controller 180 can control the display unit 151 to limit the display of the first page 545 displayed in the first region 510a.

Referring to FIG. 11A(d), the controller 180 can control a message appended with the image to be sent by an additional control command applied to the execution screen 512 of the message application. In other words, according to the present embodiment, it is possible to retrieve a function associated with the mobile terminal 100 and automatically execute the associated function by a control command for controlling the external terminal 100'.

Accordingly, the user can use information (application, stored information, etc.) contained in the mobile terminal 100 and external terminal 100' displayed in the first and the second region 510a, 510b, respectively. In addition, information (for example, phone numbers, images, text information, favorite information in a web browser, etc.) stored in the mobile terminal 100 may be displayed.

A control method of controlling the mobile terminal 100 based on a control command applied to the second window will be described with reference to FIG. 11B.

Referring to FIGS. 11B(a) and 11B(b), the controller 180 executes a first application installed in the external terminal 100' based on a touch input applied to the second window 550, and controls the display unit 151 to display the first execution screen 516 of the first application. Furthermore, the controller 180 controls the display unit 151 to display the second execution screen 546 of the second application associated with the first application and installed in the mobile terminal 100 in the first region 510a.

The first and the second application may correspond to the substantially same application, but is not limited to this. In other words, the first and the second application may correspond to the substantially same category. For example, the first and the second application may correspond to a calendar application containing the storage unit to provide the date and weekday and enter information to each date. However, the first and the second application may correspond to different applications with different driving methods or different service providers, and it does not matter that the first and the second execution screen are displayed in a different manner to each other.

Referring to FIGS. 11B(c) and 11B(d), the controller 180 can input information to a specific date based on a touch input applied to the second window 550. The controller 180 can control the wireless communication unit 110 to transmit a control command for storing the input information in the external terminal 100' to the external terminal 100'.

Furthermore, the controller 180 can control the display unit 151 to write the information input to the specific date on the second execution screen, and control the information to be stored in the memory 160 of the mobile terminal 100. In other words, the user can store information in the external terminal 100' and the mobile terminal 100 based on a touch input applied to the second window 550. Meanwhile, the controller 180 can control the change, execution, deletion and the like of the corresponding content contained in the mobile terminal 100 and the external terminal 100' as well as the storage of the information based on a control command applied to the second window 550.

Accordingly, the user can control two devices based on one control command, and immediately check a result for the control by execution screens respectively displayed on the divided display unit 151.

Figure 11C:
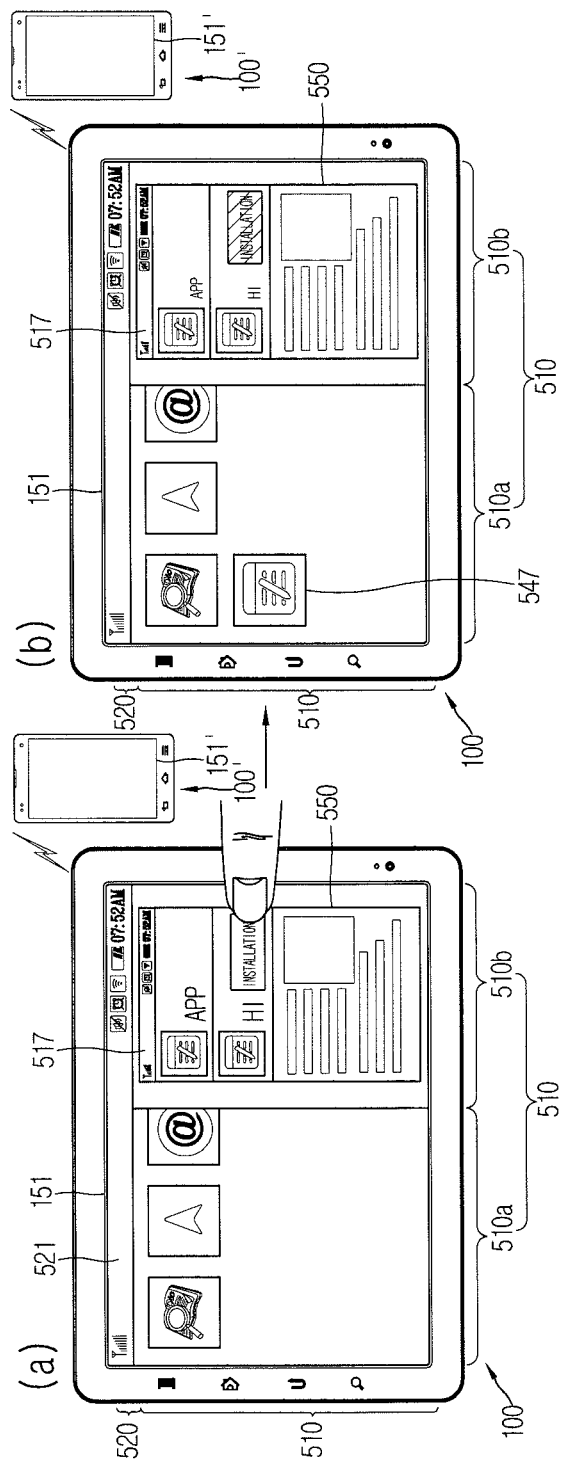

FIG. 11C is a conceptual view illustrating a method of controlling the mobile terminal 100 and external terminal 100' at the same time using a second window according to another embodiment. In FIG. 11C(a), the second window 550 displays installation screen information 517 for installing a specific application. The installation screen information 517 may include the information of the application, content controlling the installation, and the like.

On the other hand, screen information regardless of the installation screen information 517 may be displayed in the first region 510a of the first display region 510. For example, a home screen page for displaying the icons of applications installed in the mobile terminal 100 may be displayed in the first region 510a.

Referring to FIG. 11C(b), the controller 180 may install the application in the external terminal 100' by a control command applied to the second window 550 to install the application. Accordingly, the controller 180 may display a notification indicator indicating that the application is installed.

On the other hand, the controller 180 installs the application in the mobile terminal 100 based on an installation control command of the application. Accordingly, the controller 180 can control the display unit 151 to display an icon 547 corresponding to the installed application in the first region 510a. In addition, when an application installed in the external terminal 100' is inapplicable to the mobile terminal 100, the controller 180 can control the display unit 151 to display notification information indicating that installation is not enabled.

Figure 11D:
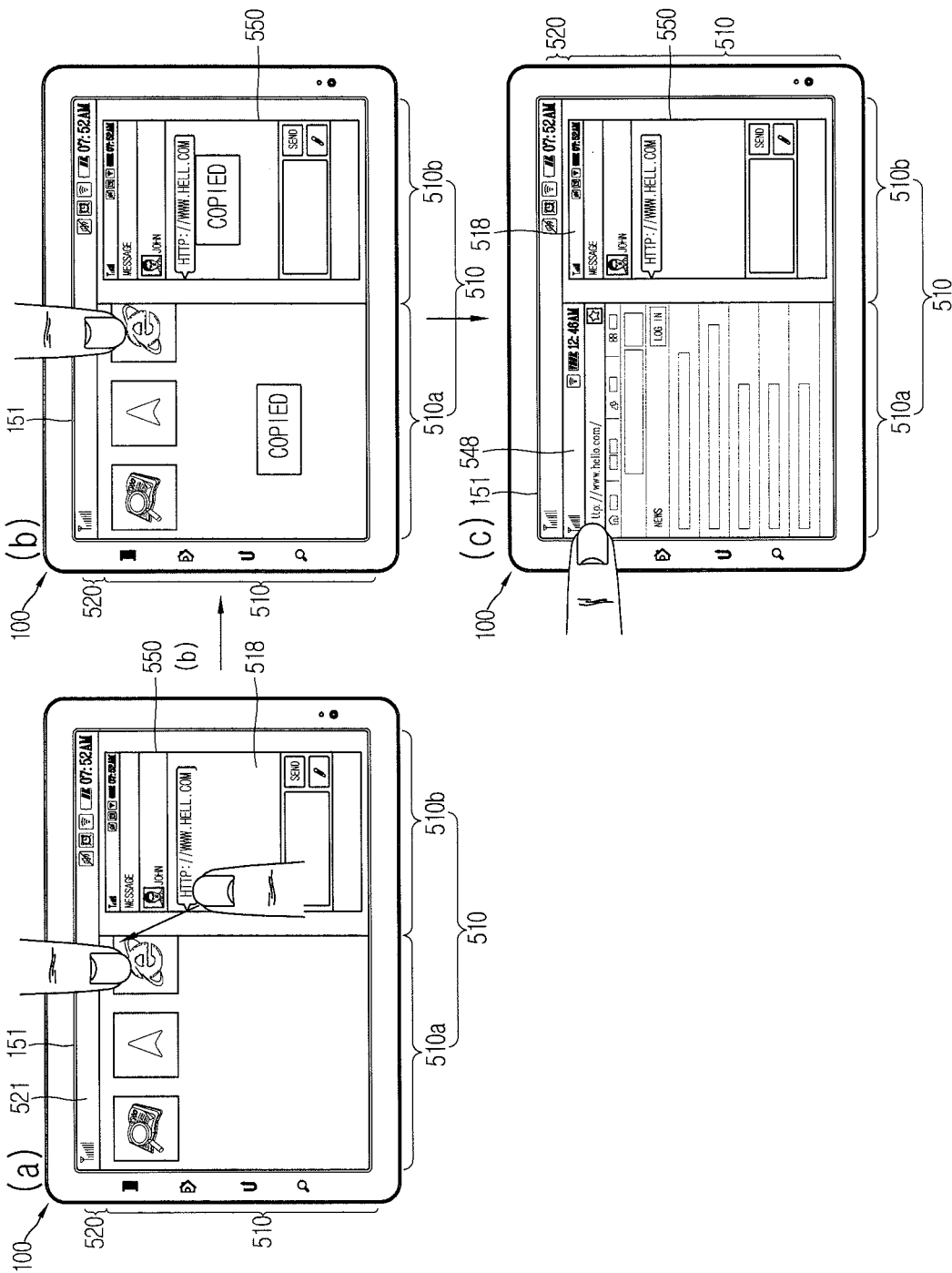

FIG. 11D is a view illustrating a control method of storing information displayed on the second window 550 in the memory 160 of the mobile terminal 100. Referring to FIGS. 11D(a) and 11D(c), the controller 180 controls content to which a touch input on the second window 550 is applied to be temporarily stored in the memory 160 of the mobile terminal 100 based on a touch input consecutively applied to the first region 510a from the second window 550.

For example, when the touch input is released from an icon displayed in the first region 510a, the controller 180 can control the display unit 151 to display the content on the execution screen 548 of an application corresponding to the icon. In addition, the controller 180 can control the memory 160 to execute an application matched to the content and store the content in the storage unit of the application based on a touch input consecutively applied to the display unit 151.

Furthermore, when content selected by the touch input corresponds to an icon of the application, the controller 180 can control the mobile terminal 100 to install the application in the mobile terminal 100. It is similar to when the consecutive touch input is applied to the second window 550 from the first region 510a. In this instance, the controller 180 controls the content of the mobile terminal 100 to be stored in the external terminal 100'.

Referring to FIGS. 11D(b) and 11D(c), the controller 180 controls specific content to be temporarily stored in the mobile terminal 100 and the mobile terminal external terminal 100' based on a touch input applied to the second window 550. For example, the thumbnail image may be implemented by a long-touch input scheme applied to the specific content for a preset period of time (about several seconds).

The controller 180 can control the display unit 151 to display notification information indicating that content is stored on the first region 510a and the second window 550. Furthermore, the controller 180 can control the display unit 151 to display the content on the execution screen based on a touch input applied to the execution screen of the application displayed on the first region 510a.

Accordingly, the user can display screen information stored in the external terminal 100' on the second window 550, and store at least part of the screen information in the mobile terminal 100.

Figure 11E:
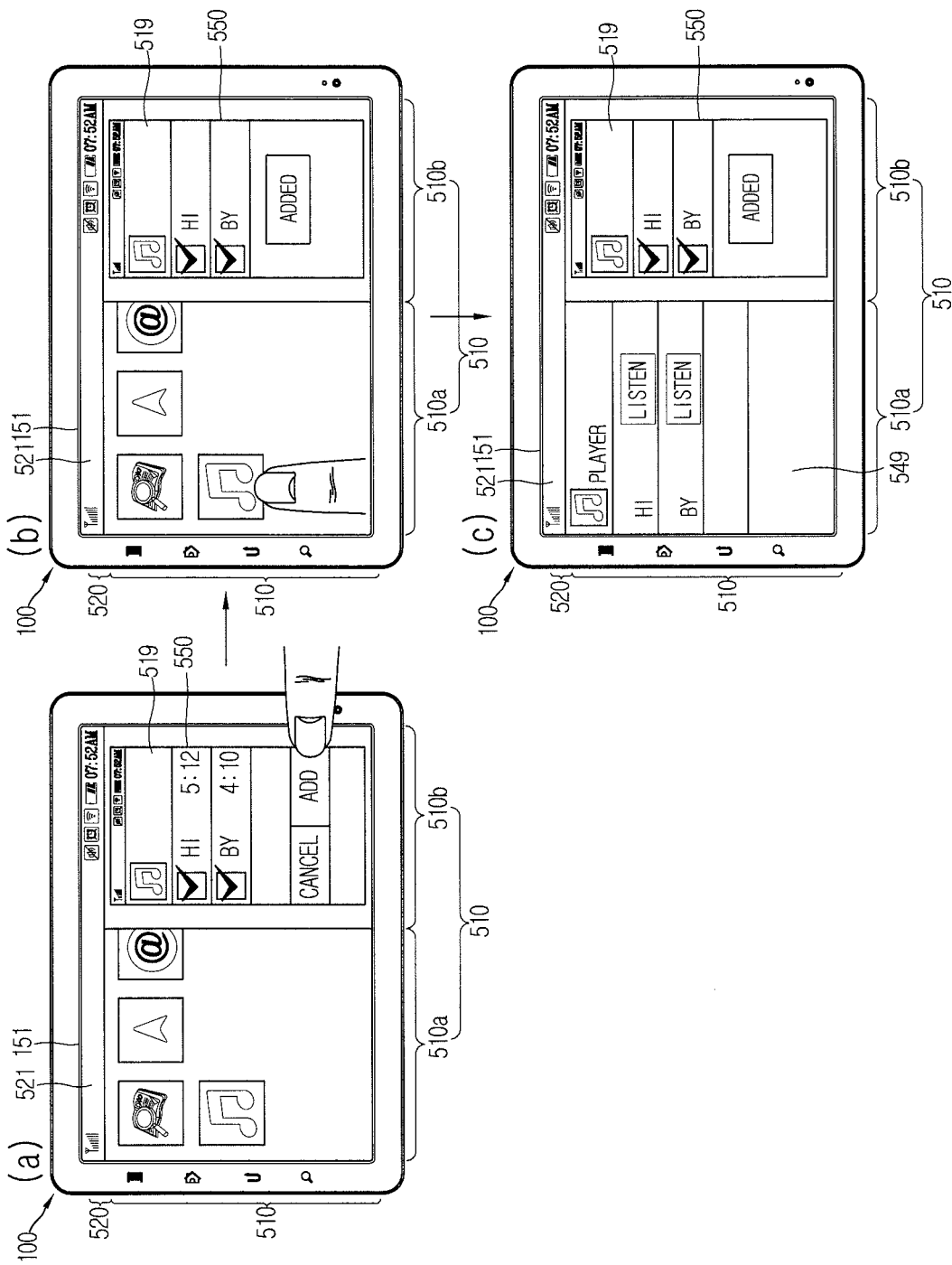

FIG. 11E is a conceptual view illustrating a control method of storing information in the storage unit of the application based on a control command applied to the second window in a state that the application of the mobile terminal 100 is not implemented.

Referring to FIG. 11E(a), the second window 550 displays a play list screen 519 of a music play application. The controller 180 controls the music file to be stored in the storage unit of the application based on a touch input applied to the second window 550, and controls the display unit 151 to display the stored music file on the play list screen 519.

On the other hand, while the play list screen 519 is displayed on the second window 550, the application may not be executed in the mobile terminal 100, and screen information regardless of the music play application may be displayed in the first region 510a.

Referring to FIGS. 11E(b) and 11E(c), the controller 180 controls the music file added based on a touch input applied to the second window 550 to be stored in the storage unit of the application associated with the music play application of the mobile terminal 100.

Specifically, the controller 180 controls the display unit 151 to displaying an execution screen 549 in the first region 510a based on a touch input applied to an icon of the associated application. However, the execution screen 549 may be displayed in other regions other than the first region 510a and on the display unit.

The controller 180 controls the display unit 151 to display information associated with a music file stored in the storage unit of the associated application in the execution screen 549.

According to an embodiment of the present invention, for an application installed in the mobile terminal 100 and the external terminal 100' and associated with each other, the function of the application controlled by a control command applied to the second window of the display unit 151 may be also applicable to the associated application of the mobile terminal 100. Accordingly, the user can more easily link the application installed in two devices with each other.

A control method of sharing information on the activated application will be described with reference to FIG. 11F. Referring to FIGS. 11F(a) and 11F(b), the controller 180 controls the wireless communication unit 110 to transmit the information of the activated application to the mobile terminal 100 while displaying the second window 550.

For example, when the execution screen 512 of a specific application is displayed on the second window 550, if a touch input is applied to content displayed on the second window 550 to display the information of the application activated in the external terminal 100', then the controller 180 controls the display unit 151 to display a first activation information window 561 containing the information of applications activated in the mobile terminal 100 and external terminal 100' on the second window 550.

The controller 180 may display the information of the activated application in a highlighted manner among the information of applications contained in the first activation information window 561 or control the display unit to display an indicator indicating that it is activated in the mobile terminal 100.

Referring to FIGS. 11F(b) and 11F(c), the controller 180 controls the display unit 151 to display the activation screen of the application in the second window 550 based on a touch input applied to the first activation information window 56. On the other hand, when an application activated in the mobile terminal 100 is selected from the information of applications contained in the first activation information window 561, the controller 180 can control the display unit 151 to display the activation screen of the application in the first region 510a or one region of the display unit 151.

Referring to FIGS. 11F(a) and 11F(d), the controller 180 can control the display unit 151 to display a second activation information window 562 based on a control command applied to the signal input unit contained in the mobile terminal 100. In this instance, the controller 180 can control the display unit 151 to display an application activated in the external terminal 100' in a highlighted manner among the information of applications contained in the second activation information window 562 or display an indicator indicating that it is activated in the external terminal 100'.

In addition, when the substantially same application is activated in the mobile terminal 100 and external terminal 100', if the same application displayed on the first and the second activation information window 561, 562 is selected, then the controller 180 can control the display unit 151 to display the activation screen of the application on the first region 510a and the second window 550, respectively.

According to an embodiment of the present embodiment, the user can receive information on an application activated in the mobile terminal 100 and external terminal 100' as well, thereby allowing the user to more easily execute his or her desired application.

Figure 11G:
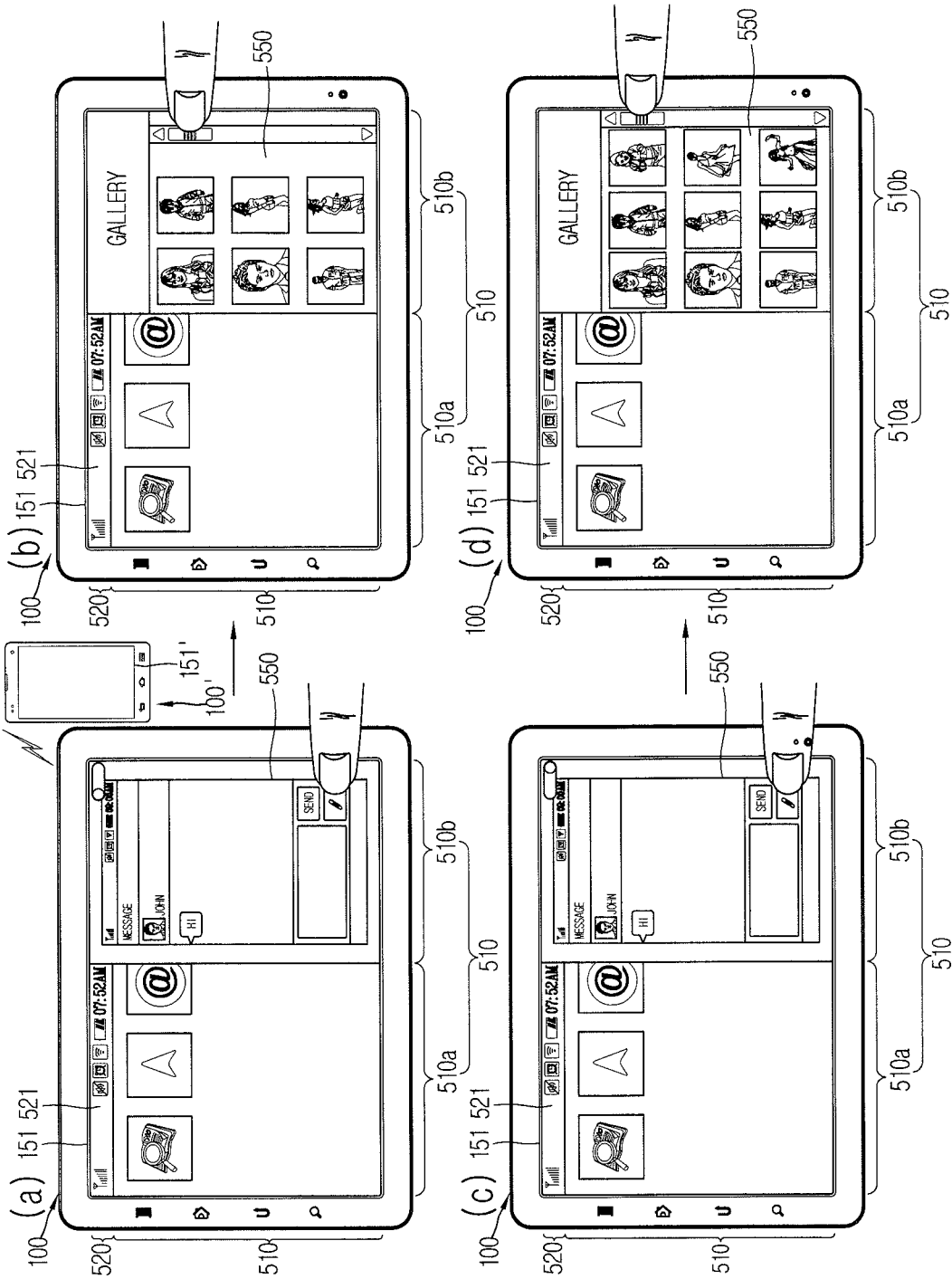

FIG. 11G is a conceptual view illustrating a method of setting the control of the mobile terminal 100 based on a touch input applied to the second window 550. The display unit 151 may include a graphic image 570 that can be switched to ON/OFF on the second window 550. The controller 180 may limit the control of the mobile terminal 100 by a control command applied to the second window 550 based on a control command applied to the graphic image 570.

Referring to FIGS. 11G(a) and 11G(b), the controller 180 controls the display unit 151 to display an execution screen of the associated application in the first region 510a based on a control command applied to the second window 550.

Referring to FIGS. 11G(c) and 11G(d), the controller 180 may block the control of the mobile terminal 100 by a control command applied to the second window 550 based on a control command applied to the graphic image 570. Accordingly, the controller 180 can control the display unit 151 to display an execution screen of a gallery application on the second window 550 based on a touch input applied to the second window 550. Accordingly, the user can control the mobile terminal 100 not to be linked based on a control command applied to the second window 550.

Figure 11H:
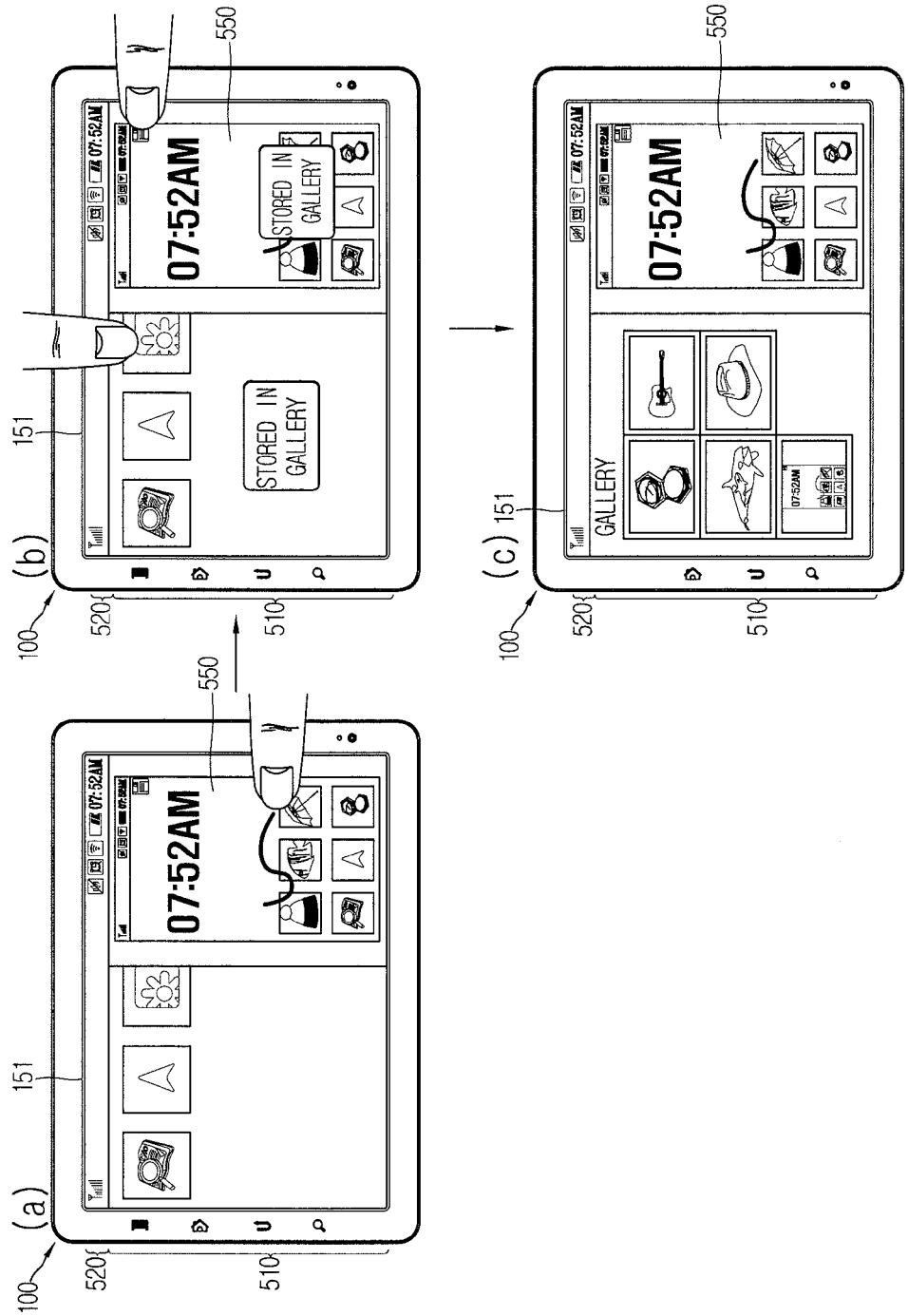

FIG. 11H is a view illustrating a control method of storing an image displayed on the second window 550 by the user in the memory 160 of the mobile terminal 100. Referring to FIG. 11H(a), the controller 180 can control the display unit 151 to display an image drawn by the user on the screen information displayed on the second window 550 based on a preset control command entered by the user.

Specifically, when the control command is applied, the controller 180 switches the display unit 151 to a memo mode (quick memo, Q-memo). In the memo mode, the 151 displays an image corresponding to a touch input applied to the screen information displayed at a time point at which the control command is applied. In this instance, the application of a control command according to the touch input is limited by the touch input on the screen information. Accordingly, the user can freely form an image on the screen information.

Referring to FIG. 11H(b), the controller 180 controls the display unit 151 to display a storage icon for storing a change icon changing the shape of an image displayed by the user's touch input in the memo mode as well as an image formed by the displayed screen information and the user.

The controller 180 controls the memory of the external terminal to store a window image (here, the window image denotes screen information and an image formed to be overlapped with the image) displayed on the second window 550 based on a touch input applied to the storage icon. Accordingly, the controller 180 controls the display unit 151 to display an indicator ("stored in the gallery") indicating information in which it has been stored in the memory of the external terminal on the second window 550.

Furthermore, the controller 180 controls the window image to be stored in the memory 160 at the same time based on a touch input applied to the storage icon. In other words, the window image is stored in the mobile terminal 100 as well as the external terminal at the same time based on a touch input applied to the storage icon on the second window 550.

In addition, the controller 180 controls the display unit 151 to display an indicator ("stored in the gallery") indicating information in which the window image has been stored on the first display region 510. However, a space in which the window image is stored may not be necessarily limited to a storage space of the gallery application, and when the mobile terminal is being connected to a storage space associated with the memo mode or the external terminal, it may be stored in a specified preset storage space.

Referring to FIG. 11H(c), when a gallery application for storing images is activated, the controller 180 can control the display unit 151 to display the window image stored in the memory 160. In other words, the user can execute an application installed in the mobile terminal to receive content (window image according to the present embodiment) stored in the second window 550 independently from the external terminal and the second window 550.

In addition, when an image entered from the memo mode is stored in the memory 160 on the first display region 510, the controller 180 can control it to be also stored in the memory of the external terminal 100' connected to the mobile terminal 100.

In other words, the controller 180 may activate a memo mode using the mobile terminal connected to the external terminal, and form an image on the execution screen image of the external terminal in the memo mode. Furthermore, the image may be stored in the mobile terminal as well as the external terminal at the same time.

Figure 11I:
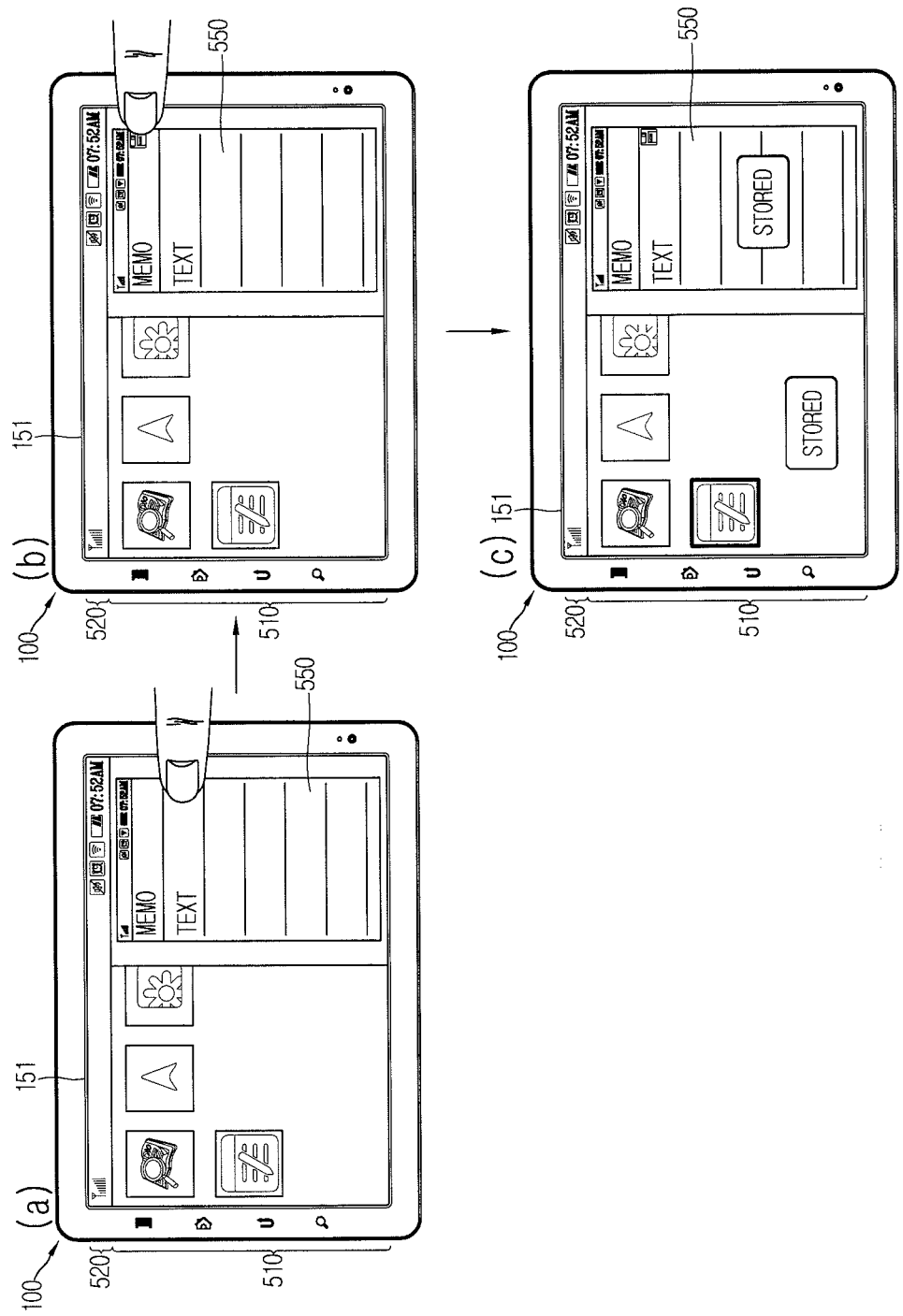

FIG. 11I is a conceptual view illustrating a control method of storing text formed on an execution screen of the memo application in a file format in the external terminal and the mobile terminal.

The controller 180 enters content by the user's touch input, and controls the display unit 151 to display an execution screen of the memo application capable of displaying it on the second window 550. However, the screen displayed on the second window 550 may not be necessarily limited to the execution screen of the memo application, and correspond to screen information for displaying content (text, images, etc.) entered by the user's touch input.

Referring to FIGS. 11I(a) and 11I(b), the controller 180 controls screen information to be stored in a file format corresponding to the memo application in the memory 160 of the mobile terminal 100 as well as the memory of the external terminal based on a touch input applied to a storage icon for storing the screen information containing the entered text. Accordingly, the controller 180 controls the display unit 151 to display an indicator indicating that the files has been stored in the two memories, respectively.

Examining FIG. 11I(c), when the relevant file is stored therein, the controller 180 controls the display unit 151 to display an indicator indicating that the file has been stored in the storage space of the memo application. For example, the controller 180 can control the display unit 151 to display an icon of the memo application along with the indicator in a highlighted manner to display the indication on the icon of the memo application.

Accordingly m, the user can store a file formed on the second window 550 in the memory 160 of the mobile terminal based on a control command applied to the second window 550. Furthermore, the file may be stored in the storage space of an appropriate application in the mobile terminal.

Figure 12:
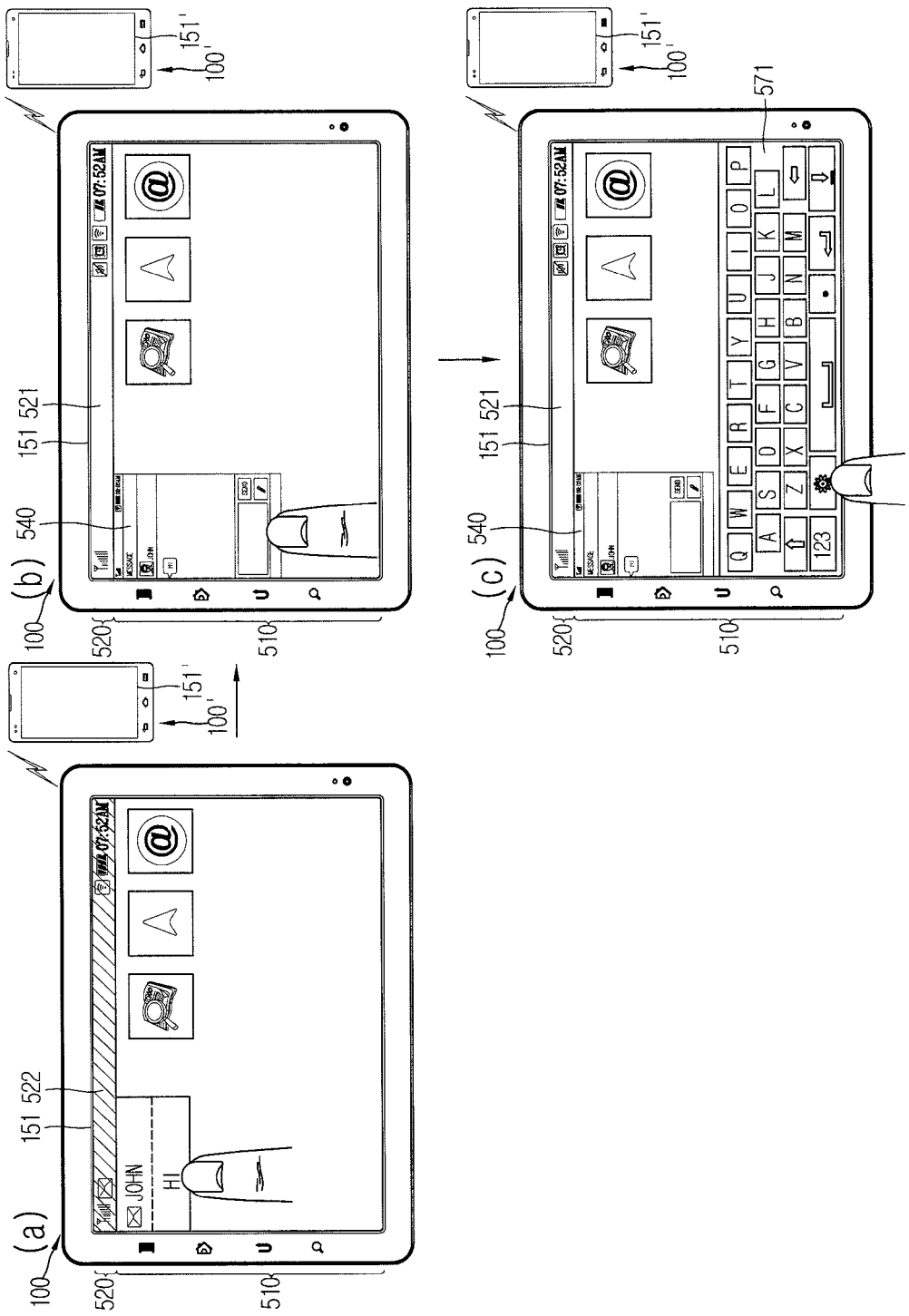
FIG. 12 is a conceptual view illustrating a control method of a first window according to an embodiment of the present invention.

FIG. 12 is a conceptual view illustrating a control method of a first window according to an embodiment of the present invention. Referring to FIGS. 12A and 12B, the controller 180 controls the display unit 151 to receive the event occurrence of the external terminal 100' and display the first window 540 on the first region 510a based on the user's control command according to this.

According to an embodiment of the present invention, the first window 540 displays the virtual screen information of the external terminal 100' provided with information on the event, and a touch input thereto on the first window 540 may be limited.

However, referring to FIGS. 12B and 12C, the controller 180 can control the event based on a touch input applied to the first window 540. Furthermore, the controller 180 may display an input window 571 for entering additional information to the first window 540 on the first display region 510 based on a control command applied to the first window 540. For example, the input window 571 may correspond to a virtual keyboard receiving a touch input for entering text. Accordingly, the user can display virtual screen information on the first window 540 with a small size and more easily enter information.

Figure 13A:
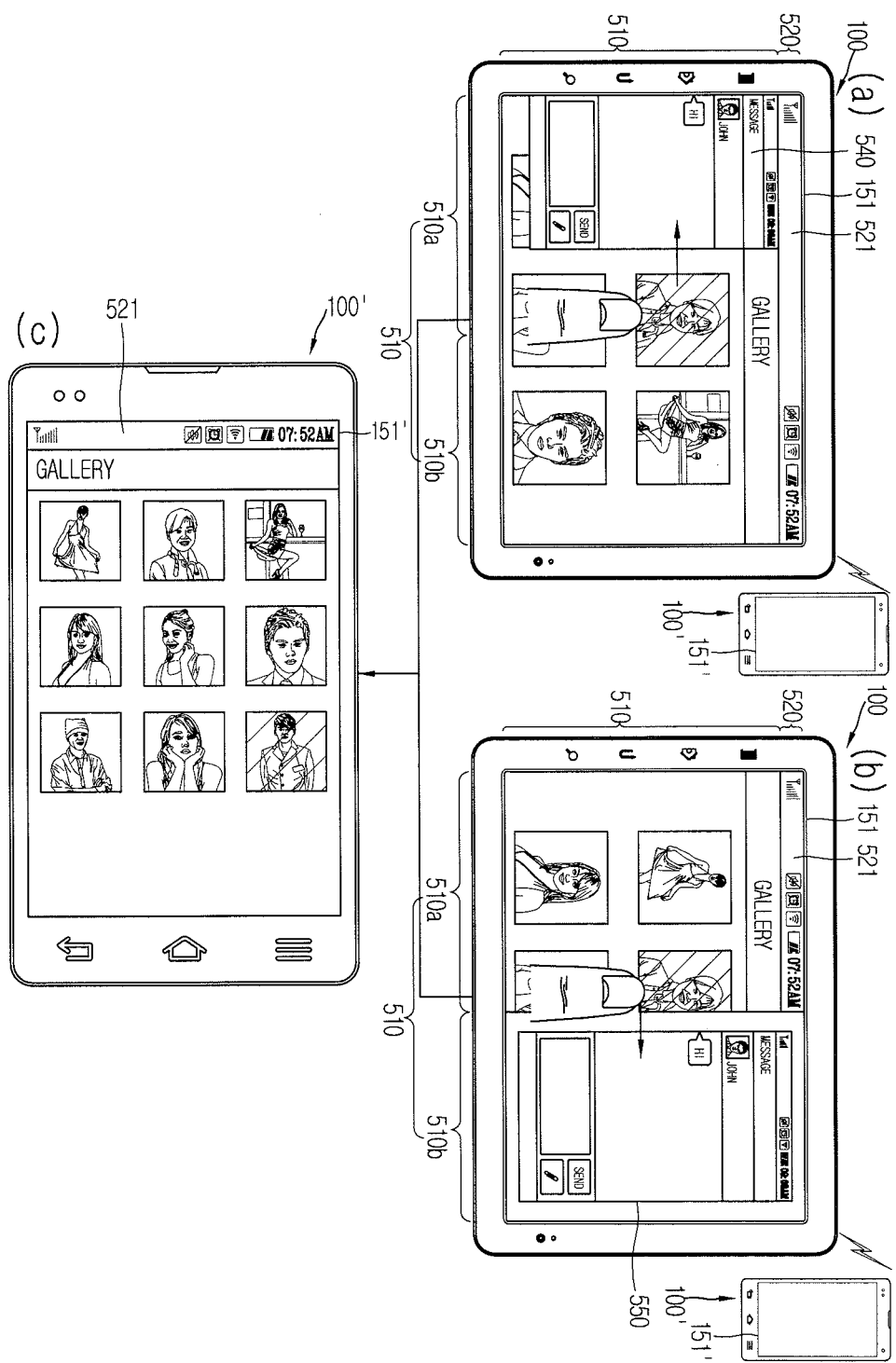
FIGS. 13A and 13B are conceptual views illustrating a control method of storing content in the external terminal.
Figure 13B:
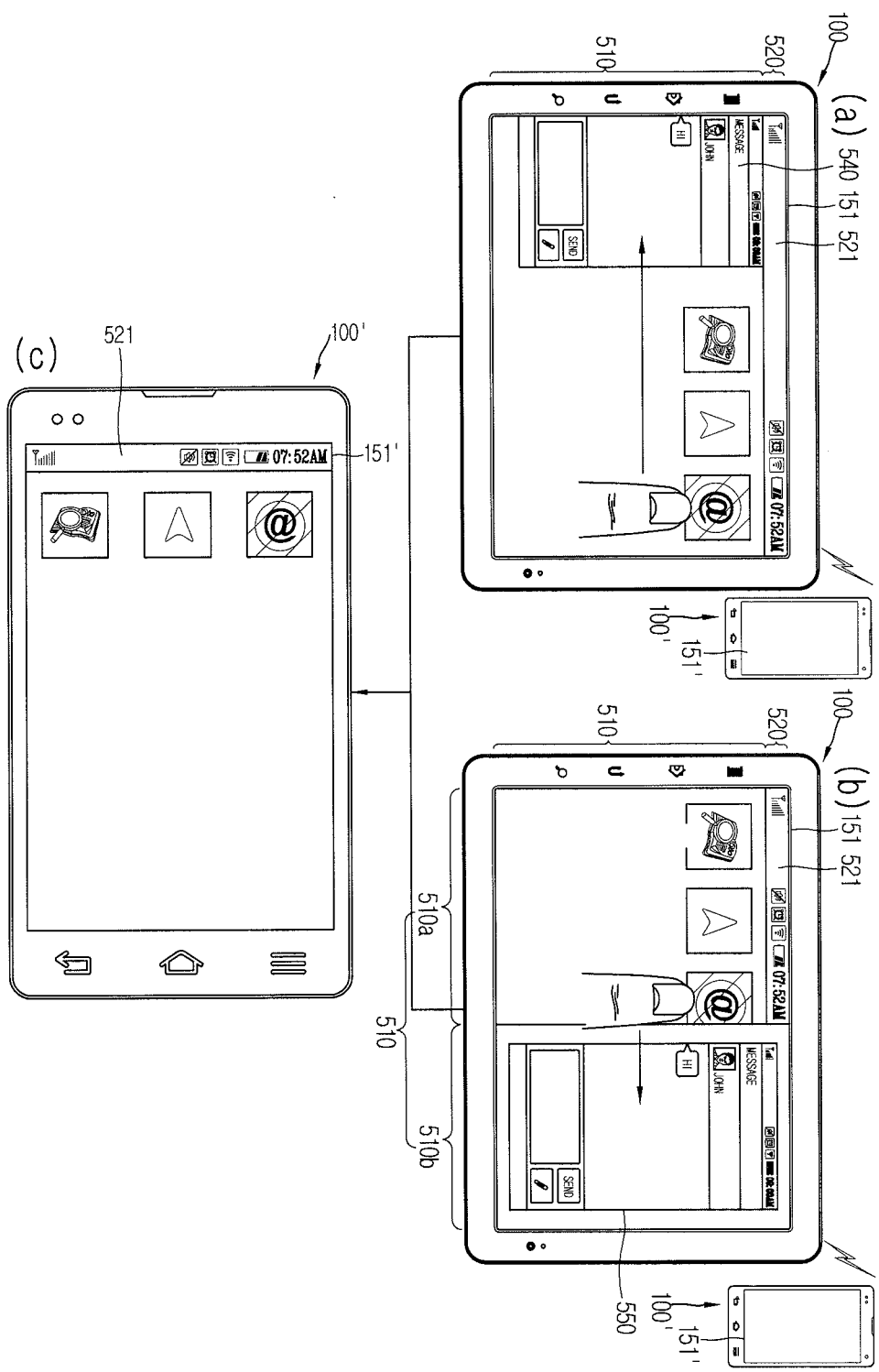

FIGS. 13A and 13B are conceptual views illustrating a control method of storing content contained in the mobile terminal 100 in the external terminal 100' based on a touch input applied to the display unit 151.

FIG. 13A(a) illustrates the display unit 151 displaying the first window 540, and FIG. 13A(b) illustrates the display unit 151 displaying the second window 550. For example, the first and the second window 540, 550 display an execution screen of a message application, and display an execution screen of a gallery application containing a plurality of images in the remaining region on the display unit 151.

The controller 180 controls one image selected from a plurality of images to be stored in the external terminal 100' based on a touch input consecutively applied to the first window 540 or second window 550. Furthermore, the controller 180 controls the image to be stored in the storage unit of an application associated with or substantially similar to the gallery application among applications installed in the external terminal 100'. In other words, the controller 180 controls such that an application corresponding to the selected content is retrieved, and the selected content is stored in the storage unit contained therein.

FIG. 13A(c) illustrates a view in which the one image is stored in the storage unit of a gallery application which is not a message application displayed on the first and the second window 540, 550. Accordingly, the user can store content in the storage unit of an appropriate application without using the process of specifying an application in which the content is to be stored.

FIG. 13A(a) illustrates the display unit 151 displaying the first window 540, and FIG. 13A(b) illustrates the display unit 151 displaying the second window 550. An icon corresponding to the application is displayed in the remaining region in FIGS. 13A(a) and 13A(b).

The controller 180 controls the installation of an application corresponding to an icon in the external terminal 100' based on a consecutive touch input applied to the icon of the first region 510a and released from the first window 540 or second window 550.

FIG. 13B(c) is a view illustrating the display unit 151' of the external terminal 100' configured to display an icon which is displayed by the installation of the application. According to the present embodiment, the user can install a specific application in the external terminal 100' in a simpler manner using a touch input applied to the display unit 151.

FIGS. 14A through 14D are conceptual views illustrating a method of controlling the display unit 151' of the external terminal 100' based on a control command applied to the second and the third window. The controller 180 controls the display unit 151 to display the second status display window 522 containing the notification image 531 based on event information occurred in the external terminal 100'.

Referring to FIGS. 14A(a) and 14A(c), the display unit 151 displays an icon 572 for receiving an execution command of an application for controlling the display unit 151' of the external terminal 100' based on the control of the display unit 151.

The controller 180 displays the second window 550 based on a touch input applied to the icon 572, and executes the execution screen of an application for controlling the event on the second window 550. For example, the event may be the reception of a message, and the application may correspond to a message application.

On the other hand, the controller 180 controls the wireless communication unit 110 to transmit a control command for activating the display unit 151' of the external terminal 100', and transmit a control command for displaying the execution screen displayed on the second window 550 on the display unit 151' of the external terminal 100'.

Referring to FIGS. 14A(b) and 14A(c), the controller 180 controls the display unit 151 to display the second window 550 for displaying the execution screen based on a touch input applied to the notification image 531. Furthermore, the controller 180 controls the wireless communication unit 110 to transmit a control command for activating the display unit 151' of the external terminal 100', and transmit a control command for displaying the execution screen displayed on the second window 550 on the display unit 151' of the external terminal 100'.

Referring to FIG. 14A(d), the controller 180 can control the execution screen and an execution screen displayed on the display unit 151' of the external terminal 100' based on an additional touch input applied to the second window 550.

For example, when a virtual keyboard for entering information to the execution screen based on a touch input applied to the second window 550 is displayed on the second window 550, the controller 180 controls the execution screen containing the virtual window to be displayed on the display unit 151' of the external terminal 100'.

Accordingly, the user can control the external terminal 100' using the mobile terminal 100, and control a status in which the external terminal 100' is controlled to be displayed on the display unit 151'.

FIG. 14B illustrates a control method in case where screen information overlapped with each other are displayed on the third window 560. The controller 180 controls the display unit to display screen information 560' displayed on the display unit 151' of the external terminal 100' on the third window 560 based on a touch input applied to the display unit.

According to the present embodiment, the screen information 560' may include a background image 560'a displayed as a whole on the display unit and a popup window 560'b (queue-slide) displayed to be overlapped with part of the background image 560'a. The popup window 560'b may be displayed in a non-transparent manner to cover part of the background image 560'a or formed in a semi-transparent or transparent manner to show the background image 560'a.

The popup window 560'b may correspond to an execution screen of a preset application. For example, the popup window 560'b may display a video being played, a TV screen or the like, and the size and transparency of the popup window 560'b, and the location thereof on the background image 560'a may be changed. In other words, the user can receive information on the popup window 560'b and information displayed on the background image 560'a at the same time.

The controller 180 controls the display unit 151 to display screen information 560' containing the popup window 560'b on the third window 560 based on the touch input. However, a size ratio of the popup window 560'b to the background image 560'a displayed on the third window 560 may be displayed in a substantially different manner from that of the popup window 560'b to the background image 560'a displayed on the external terminal.

For example, the controller 180 can control the display unit 151 to change the extent of being overlapped with each other to display the screen information 560' on the display unit 151 having a different size from that of the display unit 151' of the external terminal 100'. Furthermore, when an application on the mobile terminal corresponding to the popup window 560'b is executed, the controller 180 may determine the size of the popup window 560'b by applying it to the size of the displayed popup window.

Accordingly, the display unit 151 may display the screen information 560' such that a region of the background image 560'a overlapped with the popup window 560'b on the third window 560 is formed to be narrower than that of the screen information 560' displayed in the external terminal. Therefore, the region of the background image 560'a covered by the popup window 560'b is increased, and the user can recognize a greater region of the background image 560'a even without adjusting the transparency of the popup window 560'b.

FIG. 14B is a conceptual view illustrating a control method of displaying part of the content displayed on the screen information of the external terminal at the same time on the fifth window by changing it.

The controller 180 displays screen information 560" displayed on the display unit 151' of the external terminal 100' on the display unit 151 based on a touch input applied to the display unit 151. The controller 180 can control the display unit 151 to display part of the content provided from the screen information 560' by changing part of it. For example, when content is displayed in a divided region of the screen information 560", and additional content is provided in one region, the controller 180 controls the display unit 151 to display at least part of the additional content along with the third window 560.

Here, when additional content is provided may correspond to a case where the additional content cannot be displayed at once due to a spatial problem on the display unit 151' of the external terminal. In this instance, the display unit 151' of the external terminal 100' may provide a graphic image (for example, a scroll bar, a numerical image for switching to the next page, etc.) for providing additional content.

The controller 180 may additionally provide content scheduled for the provision in the divided region. For example, the controller 180 can control the display unit 151 to display content by changing a layout of the divided one region. It is not limited to this, and the controller 180 can control the display unit 151 to change and display the layout of the contents according to the size of the display unit 151.

In other words, when the screen information 560' is displayed on the display unit 151 of the mobile terminal with a larger size or with a different aspect ratio (in other words, when screen information is mirrored by a larger sized display), the controller 180 can control the display unit 151 to modify and display a layout to be displayed with content contained in the screen information 560'.

FIG. 14D is a conceptual view illustrating a method of controlling the display unit 151' of the external terminal 100' based on a control command applied to the third window. Referring to FIG. 14D(a), upon receiving an event occurred in the external terminal 100', the controller 180 controls the display unit 151 to display the third window 560 based on a touch input with a predetermined scheme applied to the display unit 151.

The controller 180 displays a control screen (for example, an execution screen of a message application) for controlling the event on the display unit 151, and controls the wireless communication unit 110 to transmit a control command for displaying the activation of the display unit 151' of the external terminal 100' and the control screen to the external terminal 100'. The control of the display unit 151 and the display unit 151' of the external terminal 100' may be implemented at the same time or in a sequential manner, but preferably performed at the same time for the user's convenience.

Furthermore, the control screen of the display unit and the display unit 151' of the external terminal 100' may be changed based on a touch input applied to the third window 560. However, the event is not limited to the reception of a message illustrated in the drawing, and may also correspond to the reception of a call, the notification of a missed call, and the like.

For example, when a call is received at the mobile terminal, the controller 180 may connect the call based on the touch input, and activate a call mode for speaking with the other person using the mobile terminal. In this instance, the controller 180 can control a call to be performed using at least one of the mobile terminal and the external terminal.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
a display unit divided into a first display region displaying at least one content and a second display region displaying a first status display window including information on an operating status of the mobile terminal;
a wireless communication unit configured to connect to an external terminal; and
a controller configured to:
display, on the second display region of the display unit, a portion of a second status display window without information on an operating status of the external terminal when the external terminal is connected to the mobile terminal;
receive, by the wireless communication unit, information on an event that occurred in the external terminal;
display an entire portion of the second status display window including the information on the operating status of the external terminal, and a notification image notifying the occurrence of the event in the second display region and displaying a portion of the first status display window in the second display region without the information on the operating status of the mobile terminal;
switch the entire portion of the second status display window to an entire portion of the first status display window in response to a first touch input applied to the second display region or display additional information of the event in response to a second touch input applied to the second display region; and
display a control screen on the display unit for controlling the event that occurred on the external terminal.

2. The mobile terminal of claim 1, wherein the controller is further configured to activate an application corresponding to the event on the mobile terminal, and
wherein the control screen corresponds to an execution screen of the activated application.

3. The mobile terminal of claim 1, wherein the control screen includes an authentication screen for receiving authentication information matched to the external terminal, and
wherein the controller is further configured to display the control screen only when the authentication information is entered successfully on the authentication screen.

4. The mobile terminal of claim 1, wherein the control screen includes a virtual screen representing a corresponding screen that would be displayed on a display unit of the external terminal for the event that occurred on the external terminal.

5. The mobile terminal of claim 4, wherein when an application corresponding to the event on the mobile terminal cannot be activated or is not installed on the mobile terminal, the controller is further configured to display screen information for installing the application on the display unit.

6. A method of controlling a mobile terminal, the method comprising:
displaying, via a display unit, at least one content on a first display region of the display unit and a first status display window including information of an operating status of the mobile terminal on a second display region, the display unit being divided into the first and second regions;
connecting, via a wireless communication unit of the mobile terminal, to an external terminal;
displaying, on the second display region of the display unit, a portion of a second status display window without information on an operating status of the external terminal when the external terminal is connected to the mobile terminal;
receiving, by the wireless communication unit, information on an event that occurred in the external terminal;
displaying an entire portion of the second status display window including the information on the operating status of the external terminal, and a notification image notifying the occurrence of the event in the second display region and displaying a portion of the first status display window without the information on the operating status of the mobile terminal, in the second display region;
switching the entire portion of the second status display window to an entire portion of the first status display window in response to a first touch input applied to the second display region or displaying additional information of the event in response to a second touch input applied to the second display region; and
displaying a control screen on the display unit for controlling the event that occurred on the external terminal.

7. The method of claim 6, further comprising:
activating, via the controller, an application corresponding to the event on the mobile terminal,
wherein the control screen corresponds to an execution screen of the activated application.

8. The method of claim 6, wherein the control screen includes an authentication screen for receiving authentication information matched to the external terminal, and
wherein the method further comprises displaying the control screen only when the authentication information is entered successfully on the authentication screen.

9. The method of claim 6, wherein the control screen includes a virtual screen representing a corresponding screen that would be displayed on a display unit of the external terminal for the event that occurred on the external terminal.

* * * * *